US008586701B2

(12) United States Patent
Barton et al.

(10) Patent No.: US 8,586,701 B2
(45) Date of Patent: Nov. 19, 2013

(54) PROCESS FOR THE PREPARATION OF COPOLYESTERS BASED ON 2,2,4,4-TETRAMETHYL-1,3-CYCLO-BUTANEDIOL AND 1,4-CYCLOHEXANEDIMETHANOL

(75) Inventors: Benjamin Fredrick Barton, Kingsport, TN (US); Damon Bryan Shackelford, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 1495 days.

(21) Appl. No.: 11/773,275

(22) Filed: Jul. 3, 2007

(65) Prior Publication Data

US 2007/0276065 A1 Nov. 29, 2007

Related U.S. Application Data

(63) Continuation-in-part of application No. 11/588,524, filed on Oct. 27, 2006, now abandoned, which is a continuation-in-part of application No. 11/390,752, filed on Mar. 28, 2006, now Pat. No. 8,063,173, application No. 11/773,275, which is a continuation-in-part of application No. 11/588,458, filed on Oct. 27, 2006, now abandoned, which is a continuation-in-part of application No. 11/390,672, filed on Mar. 28, 2006, now abandoned, application No. 11/773,275, which is a continuation-in-part of application No. 11/588,907, filed on Oct. 27, 2006, now abandoned, which is a continuation-in-part of application No. 11/390,794, filed on Mar. 28, 2006, now Pat. No. 8,119,761, application No. 11/773,275, which is a continuation-in-part of application No. 11/588,527, filed on Oct. 27, 2006, now abandoned, which is a continuation-in-part of application No. 11/391,565, filed on Mar. 28, 2006, now Pat. No. 7,781,562, application No. 11/773,275, which is a continuation-in-part of application No. 11/588,554, filed on Oct. 27, 2006, now abandoned, which is a continuation-in-part of application No. 11/391,659, filed on Mar. 28, 2006, now abandoned, application No. 11/773,275, which is a continuation-in-part of application No. 11/588,906, filed on Oct. 27, 2006, now Pat. No. 8,193,302, and a continuation-in-part of application No. 11/588,883, filed on Oct. 27, 2006, now abandoned.

(60) Provisional application No. 60/917,316, filed on May 10, 2007, provisional application No. 60/731,389, filed on Oct. 28, 2005, provisional application No. 60/731,454, filed on Oct. 28, 2005, provisional application No. 60/739,058, filed on Nov. 22, 2005, provisional application No. 60/738,869, filed on Nov. 22, 2005, provisional application No. 60/786,572, filed on Mar. 28, 2006, provisional application No. 60/786,596, filed on Mar. 28, 2006.

(51) Int. Cl.
*C08G 63/00* (2006.01)

(52) U.S. Cl.
USPC ........ 528/308.7; 528/272; 528/274; 528/286; 528/307; 528/308.6; 526/66

(58) Field of Classification Search
USPC ......... 526/66; 528/272, 274, 307, 271, 308.6, 528/308.7
See application file for complete search history.

(56) References Cited

U.S. PATENT DOCUMENTS

| | | |
|---|---|---|
| 2,720,507 A | 10/1955 | Caldwell |
| 2,936,324 A | 5/1960 | Hasek et al. |
| 3,091,600 A | 5/1963 | Caldwell et al. |
| 3,190,928 A | 6/1965 | Hasek et al. |
| 3,218,372 A | 11/1965 | Okmura et al. |
| 3,249,652 A | 5/1966 | Quisenberry |
| 3,313,777 A | 4/1967 | Elam et al. |
| 3,360,547 A | 12/1967 | Wilson et al. |
| 3,386,935 A | 6/1968 | Jackson et al. |
| T858012 I4 | 1/1969 | Caldwell et al. |
| 3,484,338 A | 12/1969 | Caldwell |
| 3,502,620 A | 3/1970 | Caldwell |
| T873016 I4 | 4/1970 | Gilkey et al. |
| T875010 I4 | 6/1970 | Coover et al. |
| 3,546,177 A | 12/1970 | Kibler et al. |
| 3,629,202 A | 12/1971 | Gilkey et al. |

(Continued)

FOREIGN PATENT DOCUMENTS

| | | |
|---|---|---|
| BE | 615850 | 4/1962 |
| EP | 0902052 A1 | 3/1999 |

(Continued)

OTHER PUBLICATIONS

Copending U.S. Appl. No. 12/338,453, filed Dec. 18, 2008, Emmett Dudley Crawford, et al.

(Continued)

*Primary Examiner* — Frances Tischler
(74) *Attorney, Agent, or Firm* — Betty J. Boshears; Jennifer Knight

(57) ABSTRACT

Disclosed is a process for the preparation of high molecular weight, thermoplastic copolyesters by reacting a diester composition comprising a dialkyl ester of terephthalic acid with a diol composition comprising a first diol component comprising 2,2,4,4-tetramethyl-1,3-cyclobutanediol and a second diol component comprising 1,4-cyclohexanedimethanol. The diester composition can be reacted with the first diol component to produce a polyester oligomer that can be reacted further with the second diol component to produce a modified polyester oligomer. The modified polyester oligomer can then be heated to form a copolyester. The process reduces the precipitation of poly(1,4-cyclohexylene dimethylene) terephthalate in the reaction mixture.

15 Claims, No Drawings

(56) References Cited

U.S. PATENT DOCUMENTS

| | | |
|---|---|---|
| 3,907,754 A | 9/1975 | Tershansy et al. |
| 3,915,913 A | 10/1975 | Jackson, Jr. et al. |
| 3,962,189 A | 6/1976 | Russin et al. |
| 4,010,145 A | 3/1977 | Russin et al. |
| 4,046,933 A | 9/1977 | Stefanik |
| 4,056,504 A | 11/1977 | Grundmeier et al. |
| 4,084,889 A | 4/1978 | Vischer, Jr. |
| 4,107,150 A | 8/1978 | Campbell et al. |
| 4,125,572 A | 11/1978 | Scott |
| 4,188,314 A | 2/1980 | Fox et al. |
| 4,205,157 A | 5/1980 | Duh |
| 4,223,124 A | 9/1980 | Broughton et al. |
| 4,259,478 A | 3/1981 | Jackson, Jr. et al. |
| 4,384,106 A | 5/1983 | Go et al. |
| 4,391,954 A | 7/1983 | Scott |
| 4,424,140 A | 1/1984 | Weinberg et al. |
| 4,426,512 A | 1/1984 | Barbee et al. |
| 4,442,269 A | 4/1984 | Sommerfeld et al. |
| 4,480,086 A | 10/1984 | O'Neill |
| 4,578,437 A | 3/1986 | Light et al. |
| 4,786,692 A | 11/1988 | Allen et al. |
| 4,816,308 A | 3/1989 | Shimizu et al. |
| 4,939,186 A | 7/1990 | Nelson et al. |
| 4,976,057 A | 12/1990 | Bianchi |
| 4,985,342 A | 1/1991 | Muramoto et al. |
| 5,017,679 A | 5/1991 | Chang et al. |
| 5,017,680 A | 5/1991 | Sublett |
| 5,034,252 A | 7/1991 | Nilsson et al. |
| 5,118,760 A | 6/1992 | Blakely et al. |
| 5,198,530 A | 3/1993 | Kyber et al. |
| 5,207,967 A | 5/1993 | Small et al. |
| 5,224,958 A | 7/1993 | Warunek et al. |
| 5,288,764 A | 2/1994 | Rotter et al. |
| 5,296,587 A | 3/1994 | Sumner, Jr. et al. |
| 5,310,611 A | 5/1994 | Okabe et al. |
| 5,310,787 A | 5/1994 | Kutsuwa et al. |
| 5,326,584 A | 7/1994 | Kamel et al. |
| 5,326,821 A | 7/1994 | Sasaki et al. |
| 5,331,034 A | 7/1994 | Pfahler et al. |
| 5,354,791 A | 10/1994 | Gallucci |
| 5,378,796 A | 1/1995 | George et al. |
| 5,476,919 A | 12/1995 | Schaeffer |
| 5,486,562 A | 1/1996 | Borman et al. |
| 5,498,668 A | 3/1996 | Scott |
| 5,523,382 A | 6/1996 | Beavers et al. |
| 5,534,609 A | 7/1996 | Lewis et al. |
| 5,633,340 A | 5/1997 | Hoffman et al. |
| 5,650,453 A | 7/1997 | Eckberg et al. |
| 5,705,575 A | 1/1998 | Kelsey |
| 5,750,219 A | 5/1998 | Harada et al. |
| 5,804,617 A | 9/1998 | Hoffman et al. |
| 5,814,679 A | 9/1998 | Eckberg et al. |
| 5,859,116 A | 1/1999 | Shih |
| 5,902,631 A | 5/1999 | Wang et al. |
| 5,942,585 A | 8/1999 | Scott et al. |
| 5,955,565 A | 9/1999 | Morris et al. |
| 5,958,539 A | 9/1999 | Eckart et al. |
| 5,958,581 A | 9/1999 | Khanarian et al. |
| 5,959,066 A | 9/1999 | Charbonneau et al. |
| 5,962,625 A | 10/1999 | Yau |
| 5,989,663 A | 11/1999 | Morris et al. |
| 6,011,124 A | 1/2000 | Scott et al. |
| 6,012,597 A | 1/2000 | Nishihara et al. |
| 6,030,671 A | 2/2000 | Yang et al. |
| 6,044,996 A | 4/2000 | Carew et al. |
| 6,063,464 A | 5/2000 | Charbonneau et al. |
| 6,063,465 A | 5/2000 | Charbonneau et al. |
| 6,063,495 A | 5/2000 | Charbonneau et al. |
| 6,084,019 A | 7/2000 | Matayabas et al. |
| 6,084,055 A | 7/2000 | Brunelle et al. |
| 6,096,854 A | 8/2000 | Morris et al. |
| 6,103,859 A | 8/2000 | Jernigan et al. |
| 6,114,575 A | 9/2000 | McMahon et al. |
| 6,120,477 A | 9/2000 | Campbell et al. |
| 6,120,889 A | 9/2000 | Turner et al. |
| 6,127,492 A | 10/2000 | Nagashima et al. |
| 6,221,556 B1 | 4/2001 | Gallucci et al. |
| 6,287,656 B1 | 9/2001 | Turner et al. |
| 6,320,042 B1 | 11/2001 | Michihata et al. |
| 6,359,070 B1 | 3/2002 | Khanarian et al. |
| 6,399,716 B2 | 6/2002 | Chung et al. |
| 6,406,792 B1 | 6/2002 | Briquet et al. |
| 6,429,278 B1 | 8/2002 | Howell, Jr. et al. |
| 6,437,083 B1 | 8/2002 | Brack et al. |
| 6,458,468 B1 | 10/2002 | Moskala et al. |
| 6,573,328 B2 | 6/2003 | Kropp et al. |
| 6,599,994 B2 | 7/2003 | Shelby et al. |
| 6,639,067 B1 | 10/2003 | Brinegar et al. |
| 6,656,577 B1 | 12/2003 | Adelman et al. |
| 6,669,980 B2 | 12/2003 | Hansen |
| 6,723,768 B2 | 4/2004 | Adams et al. |
| 6,733,716 B2 | 5/2004 | Belcher |
| 6,773,653 B2 | 8/2004 | Miller et al. |
| 6,818,730 B2 | 11/2004 | Brandenburg et al. |
| 6,846,508 B1 | 1/2005 | Colas et al. |
| 6,896,966 B2 | 5/2005 | Crawford et al. |
| 6,914,120 B2 | 7/2005 | Germroth et al. |
| 7,037,576 B2 | 5/2006 | Willham et al. |
| 7,122,661 B2 | 10/2006 | Fleche et al. |
| 7,169,880 B2 | 1/2007 | Shelby et al. |
| 7,211,634 B1 | 5/2007 | Martin et al. |
| 7,297,755 B2 | 11/2007 | Shelby et al. |
| 7,354,628 B2 | 4/2008 | Steube |
| 7,375,154 B2 | 5/2008 | Stafford et al. |
| 7,427,430 B2 | 9/2008 | Rhee et al. |
| 7,468,409 B2 | 12/2008 | Pearson et al. |
| 7,482,397 B2 | 1/2009 | Pearson et al. |
| 2001/0029324 A1 | 10/2001 | Walker et al. |
| 2001/0031805 A1 | 10/2001 | Bhler |
| 2001/0034419 A1 | 10/2001 | Kanayama et al. |
| 2002/0132963 A1 | 9/2002 | Quillen |
| 2003/0077546 A1 | 4/2003 | Donovan et al. |
| 2003/0135015 A1 | 7/2003 | Fujimaki et al. |
| 2003/0169514 A1 | 9/2003 | Bourdelais et al. |
| 2003/0187151 A1 | 10/2003 | Adams et al. |
| 2004/0022526 A1 | 2/2004 | Kuno et al. |
| 2004/0063864 A1 | 4/2004 | Adams et al. |
| 2004/0106707 A1 | 6/2004 | Su et al. |
| 2004/0108623 A1 | 6/2004 | Deeter et al. |
| 2004/0138381 A1 | 7/2004 | Blasius et al. |
| 2004/0145700 A1 | 7/2004 | Miniutti et al. |
| 2004/0164279 A1 | 8/2004 | Stevenson et al. |
| 2004/0202822 A1 | 10/2004 | Bourdelais et al. |
| 2005/0008885 A1 | 1/2005 | Blakely et al. |
| 2005/0075466 A1 | 4/2005 | Oguro et al. |
| 2005/0096453 A1 | 5/2005 | Flynn et al. |
| 2005/0209435 A1 | 9/2005 | Hirokane et al. |
| 2006/0094858 A1 | 5/2006 | Turner et al. |
| 2006/0111519 A1 | 5/2006 | Strand et al. |
| 2006/0135668 A1 | 6/2006 | Hayes |
| 2006/0146228 A1 | 7/2006 | Sogo et al. |
| 2006/0180560 A1 | 8/2006 | Robinson |
| 2006/0197246 A1 | 9/2006 | Hale et al. |
| 2006/0199904 A1 | 9/2006 | Hale et al. |
| 2006/0199919 A1 | 9/2006 | Hale et al. |
| 2006/0228507 A1 | 10/2006 | Hale et al. |
| 2006/0234073 A1 | 10/2006 | Hale et al. |
| 2006/0235167 A1 | 10/2006 | Hale et al. |
| 2006/0247388 A1 | 11/2006 | Hale et al. |
| 2006/0270806 A1 | 11/2006 | Hale |
| 2007/0049667 A1 | 3/2007 | Kim et al. |
| 2007/0071930 A1 | 3/2007 | Shelby et al. |

FOREIGN PATENT DOCUMENTS

| | | |
|---|---|---|
| FR | 1434658 | 2/1966 |
| GB | 962913 | 7/1964 |
| GB | 1041651 | 9/1966 |
| GB | 1044015 | 9/1966 |
| GB | 1047043 | 11/1966 |
| GB | 1090241 | 11/1967 |
| GB | 1130558 | 10/1968 |
| GB | 1278284 | 6/1972 |
| GB | 1364732 | 8/1974 |

(56) References Cited

FOREIGN PATENT DOCUMENTS

| | | |
|---|---|---|
| JP | 8-20638 | 1/1996 |
| JP | 2001214049 | 8/2001 |
| WO | 9721754 | 6/1997 |
| WO | 0185824 A2 | 11/2001 |
| WO | WO 2004009146 | 1/2004 |
| WO | 2005007735 A2 | 1/2005 |
| WO | 2006127755 | 11/2006 |
| WO | 2006127831 A1 | 11/2006 |
| WO | 2007001552 A1 | 1/2007 |
| WO | 2007001557 A1 | 1/2007 |
| WO | 2007053549 A1 | 5/2007 |
| WO | WO 2007/053434 A1 | 5/2007 |
| WO | WO 2007/053548 A2 | 5/2007 |

OTHER PUBLICATIONS

Copending U.S. Appl. No. 12/274,692, filed Nov. 11, 2008, Thomas Joseph Pecorini, et al.
USPTO Office Action dated Dec. 19, 2008 for copending U.S. Appl. No. 11/390,751.
USPTO Office Action dated Dec. 31, 2008 for copending U.S. Appl. No. 11/390,827.
USPTO Office Action dated Dec. 31, 2008 for copending U.S. Appl. No. 11/390,826.
USPTO Office Action dated Nov. 14, 2008 for copending U.S. Appl. No. 11/390,630.
USPTO Office Action dated Dec. 19, 2008 for copending U.S. Appl. No. 11/391,576.
USPTO Office Action dated Dec. 19, 2008 for copending U.S. Appl. No. 11/390,629.
USPTO Office Action dated Dec. 31, 2008 for copending U.S. Appl. No. 11/390,773.
USPTO Office Action dated Nov. 14, 2008 for copending U.S. Appl. No. 11/390,882.
USPTO Office Action dated Dec. 12, 2008 for copending U.S. Appl. No. 11/391,063.
USPTO Office Action dated Dec. 19, 2008 for copending U.S. Appl. No. 11/390,814.
USPTO Office Action dated Dec. 31, 2008 for copending U.S. Appl. No. 11/390,722.
Copending U.S. Appl. No. 12/361,779, filed Jan. 29, 2009, Emmett Dudley Crawford, et al.
Copending U.S. Appl. No. 12/365,515, filed Feb. 4, 2009, Emmett Dudley Crawford, et al.
USPTO Office Action dated Jan. 29, 2009 for copending U.S. Appl. No. 11/588,524.
USPTO Office Action dated Jan. 30, 2009 for copending U.S. Appl. No. 11/588,458.
USPTO Office Action dated Feb. 2, 2009 for copending U.S. Appl. No. 11/390,853.
Scheirs, John, et al., "Modern Polyesters: Chemistry and Technology of Polyesters and Copolyesters," Technology & Engineering, 2003, p. 287.
USPTO Office Action dated Jan. 21, 2009 for copending U.S. Appl. No. 11/390,847.
USPTO Office Action dated Jan. 12, 2009 for copending U.S. Appl. No. 11/390,858.
USPTO Office Action dated Jan. 26, 2009 for copending U.S. Appl. No. 11/391,659.
USPTO Office Action dated Jan. 26, 2009 for copending U.S. Appl. No. 11/588,554.
USPTO Office Action dated Feb. 3, 2009 for copending U.S. Appl. No. 11/391,505.
USPTO Office Action dated Feb. 10, 2009 for copending U.S. Appl. No. 11/390,865.
USPTO Office Action dated Feb. 12, 2009 for copending U.S. Appl. No. 11/439,062.
USPTO Office Action dated Feb. 13, 2009 for copending U.S. Appl. No. 11/439,340.
Chang, S. et al., "Effect of Stabilizers on the Preparation of Poly(ethylene Terephthalate)", Journal of Polymer Science, Polymer Chemistry Edition, 1982, vol. 20, pp. 2053-2061, John Wiley & Sons, Inc.
USPTO Office Action dated Mar. 11, 2008 for copending U.S. Appl. No. 11/391,642.
USPTO Office Action dated Mar. 24, 2008 for copending U.S. Appl. No. 11/390,908.
USPTO Office Action dated Apr. 15, 2008 for copending U.S. Appl. No. 11/390,629.
USPTO Office Action dated Feb. 25, 2009 for copending U.S. Appl. No. 11/588,907.
USPTO Office Action dated Feb. 25, 2009 for copending U.S. Appl. No. 11/588,527.
USPTO Office Action dated Feb. 27, 2009 for copending U.S. Appl. No. 11/390,955.
USPTO Office Action dated Feb. 25, 2009 for copending U.S. Appl. No. 11/588,906.
USPTO Office Action dated Feb. 25, 2009 for copending U.S. Appl. No. 11/588,883.
USPTO Office Action dated Mar. 5, 2009 for copending U.S. Appl. No. 11/390,864.
USPTO Office Action dated Mar. 6, 2009 for copending U.S. Appl. No. 11/391,156.
USPTO Office Action dated Feb. 25, 2009 for copending U.S. Appl. No. 11/390,811.
USPTO Office Action dated Feb. 27, 2009 for copending U.S. Appl. No. 11/390,654.
USPTO Office Action dated Feb. 27, 2009 for copending U.S. Appl. No. 11/390,836.
USPTO Office Action dated Mar. 13, 2009 for copending U.S. Appl. No. 11/390,883.
USPTO Office Action dated Mar. 11, 2009 for copending U.S. Appl. No. 11/390,630.
USPTO Office Action dated Mar. 9, 2009 for copending U.S. Appl. No. 11/391,495.
USPTO Office Action dated Mar. 9, 2009 for copending U.S. Appl. No. 11/390,750.
Copending U.S. Appl. No. 12/390,694, filed Feb. 23, 2009, Gary Michael Stack.
USPTO Office Action dated Apr. 16, 2008 for copending U.S. Appl. No. 11/390,751.
U.S. Appl. No. 12/091,572, filed Apr. 25, 2008, Ted Calvin Germroth, et al.
U. S. Appl. No. 11/827,696, filed Jul. 13, 2007, Ryan Thomas Neill, et al.
U.S. Appl. No. 12/091,568, filed Apr. 25, 2008, Emmett Dudley Crawford, et al.
U.S. Appl. No. 12/091,566, filed Apr. 25, 2008, Emmett Dudley Crawford, et al.
U.S. Appl. No. 12/091,570, filed Apr. 25, 2008, Ted Calvin Germroth, et al.
USPTO Office Action dated Apr. 17, 2008 for copending U.S. Appl. No. 11/390,814.
Kelsey, E. et al., "High Impact, Amorphous Terephthalate Copolyesters of Rigid 2,2,4,4-Tetramethyl-1,3-cyclobutanediol with Flexible Diols," Macromolecules, vol. 33, 2000, pp. 5810-5818, American Chemical Society.
USPTO Office Action dated Jun. 3, 2008 for copending U.S. Appl. No. 11/391,063.
Copending U.S. Appl. No. 12/294,690, filed Sep. 26, 2008, Ted Calvin Germroth et al.
Copending U.S. Appl. No. 12/294,686, filed Sep. 26, 2008, Ted Calvin Germroth et al.
USPTO Office Action dated Sep. 10, 2008 for copending U.S. Appl. No. 11/390,752.
USPTO Office Action dated Sep. 10, 2008 for copending U.S. Appl. No. 11/390,794.
USPTO Office Action dated Sep. 19, 2008 for copending U.S. Appl. No. 11/391,565.
USPTO Office Action dated Oct. 2, 2008 for copending U.S. Appl. No. 11/390,671.
USPTO Office Action dated Sep. 24, 2008 for copending U.S. Appl. No. 11/390,631.

(56) References Cited

OTHER PUBLICATIONS

USPTO Office Action dated Oct. 1, 2008 for copending U.S. Appl. No. 11/390,655.
USPTO Office Action dated Sep. 29, 2008 for copending U.S. Appl. No. 11/391,137.
USPTO Office Action dated Sep. 9, 2008 for copending U.S. Appl. No. 11/391,571.
USPTO Office Action dated Apr. 17, 2009 for copending U.S. Appl. No. 11/391,565.
USPTO Office Action dated Apr. 15, 2009 for copending U.S. Appl. No. 12/091,566.
USPTO Office Action dated Apr. 17, 2009 for copending U.S. Appl. No. 11/390,671.
USPTO Office Action dated Apr. 20, 2009 for copending U.S. Appl. No. 11/390,631.
USPTO Office Action dated Apr. 27, 2009 for copending U.S. Appl. No. 11/390,655.
USPTO Office Action dated Apr. 27, 2009 for copending U.S. Appl. No. 11/391,137.
USPTO Office Action dated Apr. 16, 2009 for copending U.S. Appl. No. 12/091,570.
USPTO Office Action dated Apr. 2, 2009 for copending U.S. Appl. No. 11/390,793.
USPTO Office Action dated Mar. 31, 2009 for copending U.S. Appl. No. 11/390,563.
USPTO Notice of Allowance dated Apr. 13, 2009 for copending U.S. Appl. No. 11/391,063.
USPTO Office Action dated Mar. 16, 2009 for copending U.S. Appl. No. 11/391,485.
USPTO Office Action dated Mar. 16, 2009 for copending U.S. Appl. No. 11/390,882.
USPTO Office Action dated Mar. 23, 2009 for copending U.S. Appl. No. 11/390,752.
USPTO Office Action dated Mar. 23, 2009 for copending U.S. Appl. No. 11/390,794.
USPTO Office Action dated May 13, 2009 for copending U.S. Appl. No. 12/361,779.
USPTO Office Action dated May 13, 2009 for copending U.S. Appl. No. 12/365,515.
USPTO Office Action dated May 21, 2009 for copending U.S. Appl. No. 11/706,476.
USPTO Office Action dated May 22, 2009 for copending U.S. Appl. No. 11/706,791.
USPTO Office Action dated May 18, 2009 for copending U.S. Appl. No. 11/391,505.
USPTO Office Action dated Apr. 14, 2009 for copending U.S. Appl. No. 11/635,434.
USPTO Office Action dated Apr. 14, 2009 for copending U.S. Appl. No. 11/635,433.
USPTO Office Action dated May 18, 2009 for copending U.S. Appl. No. 11/390,846.
New Copending U.S. Appl. No. 12/479,893, filed Jun. 8, 2009, Emmett Dudley Crawford, et al.
USPTO Office Action dated Jun. 11, 2009 for copending U.S. Appl. No. 11/390,809.
USPTO Office Action dated Jul. 2, 2009 for copending U.S. Appl. No. 11/390,827.
USPTO Office Action dated Aug. 7, 2009 for copending U.S. Appl. No. 11/390,773.
USPTO Office Action dated Aug. 10, 2009 for copending U.S. Appl. No. 11/390,722.
USPTO Office Action dated Aug. 27, 2009 for copending U.S. Appl. No. 11/390,826.
USPTO Office Action dated Sep. 2, 2009 for copending U.S. Appl. No. 11/391,124.
USPTO Office Action dated Sep. 10, 2009 for copending U.S. Appl. No. 11/390,812.
USPTO Office Action dated Sep. 14, 2009 for copending U.S. Appl. No. 11/391,576.
USPTO Office Action dated Sep. 24, 2009 for copending U.S. Appl. No. 11/588,883.
USPTO Office Action dated Sep. 24, 2009 for copending U.S. Appl. No. 11/390,858.
USPTO Office Action dated Sep. 28, 2009 for copending U.S. Appl. No. 11/390,847.
USPTO Office Action dated Sep. 29, 2009 for copending U.S. Appl. No. 11/390,629.
USPTO Office Action dated Sep. 29, 2009 for copending U.S. Appl. No. 11/390,751.
USPTO Office Action dated Sep. 29, 2009 for copending U.S. Appl. No. 11/390,814.
USPTO Office Action dated Oct. 2, 2009 for copending U.S. Appl. No. 11/588,524.
USPTO Office Action dated Oct. 7, 2009 for copending U.S. Appl. No. 11/588,458.
USPTO Office Action dated Oct. 19, 2009 for copending U.S. Appl. No. 11/390,563.
Ellis, Thomas S., "Miscibility of Polyamide Blends: Effects of Configuration," Polymer, vol. 36, Issue 20, 1995, pp. 3919-3926.
Dixon, E.R. et al., "The Inter-Relation of Some Mechanical Properties with Molecular Weight and Crystallinity in Poly(ethylene terephthalate)," 1968, pp. 464-470, Journal of Materials Science, vol. 3.
Shearer, N. H., "T18-Type 1 Polyesters," Mar. 1966, SPE Annual Technical Conference and Exhibition, XP009080224.
Buschow, K.H.J. et al., "Packaging: Polymers for Containers," Encyclopedia of Materials: Science and Technology, 2001, vol. 8, pp. 6646-6652, El Sevier.
Coles, Richard, et al., Food Packaging Technology, 2003, pp. 194-195 and 224-229, Blackwell Publishing.
Sajiki and Yonekubo, "Leaching of Bisphenol A (BPA) to Seawater from Polycarbonate Plastic and its Degradation by Reactive Oxygen Species," 2003, Chemosphere, 51, pp. 55-62.
Copending U.S. Appl. No. 12/254,894, filed Oct. 21, 2008, Gary Michael Stack, et al.
USPTO Office Action dated Oct. 22, 2008 for copending U.S. Appl. No. 11/391,125.
USPTO Office Action dated Oct. 20, 2008 for copending U.S. Appl. No. 11/390,672.
USPTO Office Action dated Oct. 8, 2008 for copending U.S. Appl. No. 11/390,853.
USPTO Office Action dated Oct. 9, 2008 for copending U.S. Appl. No. 11/391,505.
USPTO Notice of Allowance dated Oct. 7, 2008 for copending U.S. Appl. No. 11/390,908.
USPTO Office Action dated Oct. 14, 2008 for copending U.S. Appl. No. 11/390,811.
USPTO Office Action dated Oct. 22, 2008 for copending U.S. Appl. No. 11/390,750.
USPTO Office Action dated Oct. 22, 2008 for copending U.S. Appl. No. 11/390,865.
USPTO Office Action dated Oct. 14, 2008 for copending U.S. Appl. No. 11/390,654.
USPTO Office Action dated Oct. 20, 2008 for copending U.S. Appl. No. 11/390,836.
USPTO Office Action dated Nov. 3, 2009 for copending U.S. Appl. No. 11/390,883.
USPTO Office Action dated Nov. 4, 2009, for copending U.S. Appl. No. 11/390,750.
USPTO Office Action dated Nov. 4, 2009, for copending U.S. Appl. No. 11/390,864.
Interview Summary dated Oct. 28, 2009 in copending U.S. Appl. No. 11/635,434.
Gachter, Muller, "Taschenbuch der Kunststoff-Additive," 1990, Carl Hanser Verlag Munchen Wien, XP002450422, pp. 96-97.
Gachter, Muller, "Kunststoff-Additive," 1990, Carl Hanser Verlag Munchen Wien, XP002449987, pp. 96-99.
USPTO Office Action dated Oct. 29, 2008 for copending U.S. Appl. No. 11/390,955.
USPTO Office Action dated Nov. 3, 2008 for copending U.S. Appl. No. 11/390,883.

(56) References Cited

OTHER PUBLICATIONS

USPTO Office Action dated Oct. 29, 2008 for copending U.S. Appl. No. 11/390,864.
USPTO Notice of Allowance dated Nov. 3, 2008 for copending U.S. Appl. No. 11/391,642.
USPTO Office Action dated Oct. 31, 2008 for copending U.S. Appl. No. 11/391,156.
USPTO Office Action dated Oct. 30, 2008 for copending U.S. Appl. No. 11/391,495.
USPTO Office Action dated Nov. 3, 2008 for copending U.S. Appl. No. 11/391,485.
USPTO Office Action dated Oct. 21, 2009 for copending U.S. Appl. No. 11/391,156.
USPTO Office Action dated Oct. 22, 2009 for copending U.S. Appl. No. 11/588,906.
USPTO Office Action dated Nov. 17, 2009 for copending U.S. Appl. No. 12/254,894.
USPTO Office Action dated Nov. 18, 2009 for copending U.S. Appl. No. 11/390,630.
USPTO Office Action dated Nov. 30, 2009 for copending U.S. Appl. No. 11/391,495.
USPTO Office Action dated Nov. 18, 2009 for copending U.S. Appl. No. 11/390,794.
USPTO Office Action dated Nov. 20, 2009 for copending U.S. Appl. No. 11/391,485.
USPTO Office Action dated Nov. 20, 2009 for copending U.S. Appl. No. 11/390,882.
USPTO Office Action dated Dec. 1, 2009 for copending U.S. Appl. No. 12/091,570.
USPTO Office Action dated Dec. 3, 2009 for copending application 111/395,505.
USPTO Office Action dated Dec. 4, 2009 for copending U.S. Appl. No. 12/091,566.
USPTO Office Action dated Dec. 18, 2009 for copending U.S. Appl. No. 11/390,846.
Gupta, V.B. et al., "PET Fibers, Films, and Bottles: Section 5-7", Handbook of Thermoplastic Polyesters: Homopolymers, Copolymers, Blends, and Composites, 2005, pp. 362-388, Wiley InterScience.
Turner, S.R., et al., "Amorphous and Crystalline Polyesters based on 1,4-Cyclohexanedimethanol", Chapter 7, Modern Polyesters: Chemistry and Technology of Polyesters and Copolyesters, Edited by J. Sheirs and T.E. Long, 2003 John Wiley & Sons, Ltd., pp. 267-292.
Zipper, Marcus D. et al., "A Free Volume Study of Miscible Polyester Blends," 1995, pp. 127-136, Polymer International, vol. 36.
APEC High-Heat Polycarbonate Resin, 2004, Bayer Material Science Product Information Not Prior Art; Submitted for State of the Art.
Lobo, Hubert et al, "Handbook of Plastics Analysis," 2003, pp. 20 and 21, Marcel Dekker, Inc.
USPTO Office Action dated Jul. 8, 2010 from copending U.S. Appl. No. 11/390,809.
USPTO Notice of Allowance dated Jul. 8, 2010 from copending U.S. Appl. No. 11,390,883.
USPTO Notice of Allowance dated Jul. 8, 2010 from copending U.S. Appl. No. 11,390,630.
USPTO Office Action dated Jul. 12, 2010 from copending U.S. Appl. No. 11/390,794.
USPTO Notice of Allowance dated Jul. 13, 2010 from copending U.S. Appl. No. 11/391,505.
USPTO Office Action dated Jul. 22, 2010 from copending U.S. Appl. No. 12/479,893.
USPTO Notice of Allowance dated Jul. 22, 2010 from copending U.S. Appl. No. 11/391,485.
USPTO Notice of Allowance dated Aug. 3, 2010 for copending U.S. Appl. No. 11/390,864.
New copending USPTO U.S. Appl. No. 12/853,717, filed Aug. 10, 2010.
USPTO Notice of Allowance dated Aug. 11, 2010 for copending U.S. Appl. No. 11/390,631.
USPTO Notice of Allowance dated Sep. 2, 2010 for U.S. Appl. No. 11/390,811.
USPTO Office Action dated Sep. 2, 2010 for U.S. Appl. No. 11/391,124.
USPTO Office Action dated Oct. 5, 2010 for U.S. Appl. No. 11/390,655.
New copending U.S. Appl. No. 12/900,060, filed Oct. 7, 2010.
USPTO Office Action dated Oct. 8, 2010 for U.S. Appl. No. 11/390,812.
USPTO Notice of Allowance dated Oct. 14, 2010 for U.S. Appl. No. 11/390,722.
USPTO Office Action dated Oct. 27, 2010 for U.S. Appl. No. 11/390,836.
USPTO Office Action dated Oct. 27, 2010 for copending U.S. Appl. No. 12/294,690.
USPTO Notice of Allowance dated Oct. 28, 2010 for copending U.S. Appl. No. 11/390,827.
USPTO Notice of Allowance dated Nov. 2, 2010 for copending U.S. Appl. No. 12/724,480.
USPTO Notice of Allowance dated Nov. 4, 2010 for copending U.S. Appl. No. 12/724,468.
USPTO Notice of Allowance dated Nov. 4, 2010 for copending U.S. Appl. No. 11/390,955.
USPTO Office Action dated Nov. 4, 2010 for copending U.S. Appl. No. 12/294,686.
USPTO Notice of Allowance dated Nov. 4, 2010 for copending U.S. Appl. No. 11/390,826.
New copending U.S. Appl. No. 12/943,217, filed Nov. 10, 2010.
Copending U.S. Appl. No. 12/639,324, filed Dec. 16, 2009.
USPTO Notice of Allowance dated Dec. 22, 2009 for copending U.S. Appl. No. 12/361,779.
USPTO Office Action dated Jan. 7, 2010 for copending U.S. Appl. No. 12/091,568.
USPTO Office Action dated Jan. 13, 2010 for copending U.S. Appl. No. 11/635,433.
USPTO Office Action dated Jan. 14, 2010 for copending U.S. Appl. No. 11/390,809.
USPTO Notice of Allowance dated Jan. 27, 2010 for copending U.S. Appl. No. 11/635,434.
USPTO Office Action dated Mar. 11, 2010, for copending U.S. Appl. No. 11/391,812.
Copending U.S. Appl. No. 12/724,492, filed Mar. 16, 2010.
Copending U.S. Appl. No. 12/724,480, filed Mar. 16, 2010.
Copending U.S. Appl. No. 12/724,468, filed Mar. 16, 2010.
USPTO Office Action dated Mar. 19, 2010, for copending U.S. Appl. No. 11/588,527.
USPTO Notice of Allowance dated Mar. 24, 2010 for copending U.S. Appl. No. 11/391,565.
USPTO Office Action dated Mar. 29, 2010 for copending U.S. Appl. No. 11/390,812.
USPTO Notice of Allowance dated Apr. 15, 2010 for copending U.S. Appl. No. 11/391,505.
USPTO Office Action dated Apr. 19, 2010 for copending U.S. Appl. No. 12/724,480.
USPTO Office Action dated Apr. 21, 2010 for copending U.S. Appl. No. 12/724,468.
USPTO Office Action dated Apr. 21, 2010 for copending U.S. Appl. No. 12/724,492.
USPTO Office Action dated May 6, 2010 for copending U.S. Appl. No. 12/254,894.
New copending U.S. Appl. No. 12/784,193, filed May 20, 2010, Emmett Dudley Crawford, et al.
USPTO Notice of Allowance dated May 13, 2010 for copending U.S. Appl. No. 11/390,629.
USPTO Notice of Allowance dated May 13, 2010 for copending U.S. Appl. No. 11/390,751.
USPTO Notice of Allowance dated May 21, 2010 for copending U.S. Appl. No. 11/391,156.
USPTO Notice of Allowance dated May 26, 2010 for copending U.S. Appl. No. 11/391,495.
USPTO Notice of Allowance dated Jun. 24, 2010 for copending U.S. Appl. No. 11/391,576.

(56) References Cited

OTHER PUBLICATIONS

USPTO Office Action dated Jun. 24, 2010 for copending U.S. Appl. No. 11/390,846.
New copending U.S. Appl. No. 12/888,648, filed Sep. 23, 2010, Thomas Joseph Pecorini et al.
USPTO Notice of Allowance dated Nov. 23, 2010 for copending U.S. Appl. No. 11/390,563.
New copending U.S. Appl. No. 12/963,703, filed Dec. 9, 2010.
New copending U.S. Appl. No. 12,963,698, filed Dec. 9, 2010.
New copending U.S. Appl. No. 13/007,838, filed Jan. 17, 2011, Emmett Dudley Crawford et al.
New copending U.S. Appl. No. 13/016,147, filed Jan. 28, 2011, Emmett Dudley Crawford, et al.
New copending U.S. Appl. No. 13/017,069, filed Jan. 31, 2011, Emmett Dudley Crawford, et al.
New Copending U.S. Appl. No. 13/017,352, filed Jan. 31, 2011, Emmett Dudley Crawford, et al.
USPTO Office Action dated Jan. 25, 2011 for copending U.S. Appl. No. 12/853,717.
Al-Malaika, S., "Stabilization", Encyclopedia of Polymer Science and Technology, vol. 4, 2001, pp. 179-229, John Wiley & Sons, Inc.
USPTO Notice of Allowance dated Jan. 26, 2011 for copending U.S. Appl. No. 11/390,858.
USPTO Office Action dated Feb. 2, 2011 for copending U.S. Appl. No. 11/390,655.
USPTO Office Action dated Mar. 17, 2011 for copending U.S. Appl. No. 12/479,893.
USPTO Notice of Allowance dated Mar. 17, 2011 for copending U.S. Appl. No. 11/391,137.
USPTO Office Action dated Feb. 14, 2011 for copending U.S. Appl. No. 12/294,690.
USPTO Notice of Allowance dated Feb. 18, 2011 for copending U.S. Appl. No. 11/390,809.
USPTO Notice of Allowance dated Feb. 17, 2011 for copending U.S. Appl. No. 11/390,812.
USPTO Office Action dated Jun. 2, 2011 for copending U.S. Appl. No. 12/338,453.
USPTO Office Action dated Jun. 16, 2011 for copending U.S. Appl. No. 12/390,694.
USPTO Notice of Allowance dated Aug. 12, 2011 for copending U.S. Appl. No. 11/390,752.
USPTO Office Action dated Jul. 19, 2011 for copending U.S. Appl. No. 11/390,794.
USPTO Notice of Allowance dated Jul. 21, 2011 for copending U.S. Appl. No. 11/390,671.
USPTO Notice of Allowance dated Aug. 3, 2011 for copending U.S. Appl. No. 11/390,655.
New copending U.S. Appl. No. 13/162,870, filed Jun. 17, 2011, Emmett Dudley Crawford, et al.
USPTO Office Action dated Jul. 7, 2011 for copending U.S. Appl. No. 11/588,906.
USPTO Office Action dated Jun. 22, 2011 for copending U.S. Appl. No. 12/091,570.
USPTO Office Action dated Jun. 8, 2011 for copending U.S. Appl. No. 11/588,883.
USPTO Office Action dated Aug. 17, 2011 for copending U.S. Appl. No. 12/274,692.
New copending U.S. Appl. No. 13/215,511, filed Aug. 23, 2011, Emmett Dudley Crawford, et al.
USPTO Office Action dated Sep. 14, 2011 for copending U.S. Appl. No. 13/017,069.
USPTO Notice of Allowance dated Sep. 16, 2011 for copending U.S. Appl. No. 11/390,671.
USPTO Notice of Allowance dated Sep. 16, 2011 for copending U.S. Appl. No. 12/784,193.

PROCESS FOR THE PREPARATION OF COPOLYESTERS BASED ON 2,2,4,4-TETRAMETHYL-1,3-CYCLOBUTANEDIOL AND 1,4-CYCLOHEXANEDIMETHANOL

CROSS REFERENCES TO RELATED APPLICATIONS

This application claims the benefit of U.S. Provisional Application Ser. No. 60/917,316, filed May 10, 2007. In addition, this application is a continuation in part of the following applications: U.S. patent application Ser. No. 11/588,524, filed Oct. 27, 2006, which is a continuation in part of U.S. patent application Ser. No. 11/390,752, filed Mar. 28, 2006, which claims the benefit of U.S. Provisional Application Ser. No. 60/731,389, filed Oct. 28, 2005; U.S. patent application Ser. No. 11/588,458, filed Oct. 27, 2006, which is a continuation in part of U.S. patent application Ser. No. 11/390,672, filed Mar. 28, 2006, which claims the benefit of U.S. Provisional Application Ser. No. 60/731,454, filed Oct. 28, 2005; U.S. patent application Ser. No. 11/588,907, filed Oct. 27, 2006, which is a continuation in part of U.S. patent application Ser. No. 11/390,794, filed Mar. 28, 2006, which claims the benefit of U.S. Provisional Application Ser. No. 60/739,058, filed Nov. 22, 2005; U.S. patent application Ser. No. 11/588,527, filed Oct. 27, 2006, which is a continuation in part of U.S. patent application Ser. No. 11/391,565, filed Mar. 28, 2006, which claims the benefit of U.S. Provisional Application Ser. No. 60/738,869, filed Nov. 22, 2005; U.S. patent application Ser. No. 11/588,554, filed Oct. 27, 2006, which is a continuation in part of U.S. patent application Ser. No. 11/391,659, filed Mar. 28, 2006; U.S. patent application Ser. No. 11/588,906, filed Oct. 27, 2006, which claims the benefit of U.S. Provisional Application Ser. No. 60/786,572, filed Mar. 28, 2006; and U.S. patent application Ser. No. 11/588,883, filed Oct. 27, 2006, which claims the benefit of U.S. Provisional Application Ser. No. 60/786,596, filed Mar. 28, 2006.

FIELD OF THE INVENTION

This invention pertains to a process for the preparation of thermoplastic copolyesters. More particularly, this invention pertains to a copolyester process in which a diester composition, comprising a diester of terephthalic acid, is reacted with a diol composition comprising 2,2,4,4-tetramethyl-1,3-cyclobutanediol and 1,4-cyclohexanedimethanol in which at least a portion of the 2,2,4,4-tetramethyl-1,3-cyclobutanediol is allowed to react first with the diester composition before the reaction of all of the 1,4-cyclohexanedimethanol with the diester composition is completed.

BACKGROUND OF THE INVENTION

Copolyesters containing 1,4-cyclohexanedimethanol (abbreviated hereinafter as "CHDM") as a diol component are often produced using a dialkyl esters such as, for example, dimethyl terephthalate (DMT), dimethyl isophthalate, and 1,4-dimethylcyclohexane dicarboxylate, as the source of the diacid component. In a typical process, for example, a dialkyl ester is reacted with one or more diols in a transesterification reaction to produce an oligomer. The alkyl alcohol by-product is removed from the reaction medium, usually by distillation, to help push the reaction equilibrium toward oligomer formation. Typical ester exchange process temperatures for these copolyesters range from 180° C. to about 270° C. at absolute pressures between about 45 to about 550 kPa. The transesterification step is followed by a polymerization step where excess diol is removed and the oligomer converted further in a polycondensation reaction to yield a high molecular weight copolyester. Copolyesters produced from dimethyl terephthalate (abbreviated herein as "DMT"), 2,2,4,4-tetramethyl-1,3-cyclobutanediol (abbreviated herein as "TMCD"), and 1,4-cyclohexanedimethanol (abbreviated herein as "CHDM") in either a batch or continuous process are known to be prone to premature formation of poly(1,4-cyclohexylene dimethylene) terephthalate (abbreviated herein as "PCT"), resulting in precipitation of low molecular weight PCT species. PCT precipitation can terminate the preparation of the polyester before the targeted molecular weight or desired composition is obtained. In addition, the PCT can foul process equipment. PCT is known to have a melt temperature (Tm) of about 290° C.; process temperatures of 290° C. and greater, therefore, generally will melt the low molecular weight PCT precipitant and return it to the reaction mixture. Process temperatures greater than about 270° C., however, can accelerate the thermal degradation of raw materials and intermediate species, produce color, and lower the molecular weight of the polymer. Thermal degradation is particularly troublesome when thermally sensitive diols such as, for example, TMCD, are present in the copolyester reaction mixture. Therefore, attempting higher process temperatures in order to avoid premature PCT precipitation is undesirable. These problems have created a need for an alternative copolyester process that avoids PCT precipitation when terephthalate esters are used as starting materials in combination with diol components comprising CHDM and TMCD.

SUMMARY OF THE INVENTION

We have discovered that copolyesters based on dialkyl esters of terephthalic acid, 1,4-cyclohexanedimethanol, abbreviated herein as "CHDM", and 2,2,4,4-tetramethyl-1,3-cyclobutanediol (abbreviated herein as "TMCD") may be produced efficiently by reacting all or a portion of the TMCD with the diester to form a polyester oligomer and then reacting that polyester oligomer with all or a portion of the CHDM to form a modified polyester oligomer that further can be polymerized into a thermoplastic copolyester. Thus, the present invention provides process for the preparation of a copolyester, comprising:
  reacting a diester composition comprising at least one dialkyl terephthalic acid ester with a diol composition, the diol composition comprising a first diol component comprising 2,2,4,4-tetramethyl-1,3-cyclobutanediol and a second diol component comprising 1,4-cyclohexanedimethanol, the reaction comprising
    (i) reacting the first diol component with the diester composition to form a polyester oligomer;
    (ii) reacting the second diol component with the polyester oligomer of step (i) form a modified polyester oligomer; and
    (iii) heating the modified polyester oligomer to form a thermoplastic, random copolyester having an inherent viscosity of about 0.4 dL/g to about 1.0;
  wherein the molar ratio of all diols in the diol composition to all diesters in the diester composition is about 1.2 to about 1.5.

Our novel process employs, in one embodiment, a total diol:diester molar ratio of about 1.2 to about 1.5. In some embodiments of the invention, the copolyesters can have excellent clarity and may be used in packaging applications, textiles, sheeting, and film. The first and second diol components each may be reacted with the diester composition in an incremental manner, for example, by adding one or more of the diol components to the reaction mixture in 2 or more stages or continuously.

A wider range of molar diol:diester ratios can be used if at least a 50 mole percent conversion of the TMCD to a polyester oligomer is allowed to occur before all of the CHDM is allowed to react. Another aspect of the invention, therefore, is a process for the preparation of a copolyester, comprising:

reacting a diester composition, comprising at least one dialkyl terephthalic acid ester, with a diol composition, the diol composition comprising a first diol component comprising 2,2,4,4-tetramethyl-1,3-cyclobutanediol and a second diol component comprising 1,4-cyclohexanedimethanol, the reaction comprising
(i) reacting the first diol component with the diester component to form a polyester oligomer at a conversion of the 2,2,4,4-tetramethyl-1,3-cyclobutanediol of at least 50 mole percent, based on the total moles of the 2,2,4,4-tetramethyl-1,3-cyclobutanediol in the diol composition;
(ii) reacting the second diol component with the polyester oligomer of step (i) form a modified polyester oligomer; and
(iii) heating the modified polyester oligomer to form a thermoplastic, random copolyester having an inherent viscosity of about 0.4 dL/g to about 1.0;
wherein the molar ratio of all diols in the diol composition to all diesters in the diester composition is about 1.1 to about 1.5.

Although the process of the invention may be used to prepare any copolyester, it is particularly useful for copolyesters containing the residues of high boiling diols, such as CHDM and TMCD, that have substantial differences in reactivity with diesters, and where removal of excess diol is difficult because of the high temperatures required to distill the diol from the reaction mixture. The term "high-boiling diol", as used herein, means a diol that exhibits a boiling point above 230° C. at atmospheric pressure (approximately 101 kPa, absolute). Thus, our process can be used advantageously for the preparation of a variety of copolyesters containing the residues of 1,4-cyclohexanedimethanol and 2,2,4,4-tetramethyl-1,3-cyclobutanediol. For example, the copolyester prepared by the process of the invention can comprise about 60 to 100 mole percent, based on the total moles of diacid residues, of the residues of terephthalic acid, isophthalic acid, or combinations thereof; and about 10 to about 90 mole percent, based on the total moles of diol residues, of the residues 1,4-cyclohexanedimethanol, about 10 to about 90 mole percent of the residues of 2,2,4,4-tetramethyl-1,3-cyclobutanediol, and 0 to about 80 mole percent of the residues of neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 1,3-cyclohexanedimethanol, bisphenol A, polyalkylene glycol, or combinations thereof. The copolyesters prepared by the process of the instant invention are thermoplastic copolyesters having an inherent viscosity (abbreviated herein as "IV") of about 0.4 dL/g to about 1.0 dL/g. Other examples of an IV ranges that may be exhibited by the copolyester are 0.55 dL/g to 0.75 dL/g and 0.65 dL/g to 0.75 dL/g.

Yet another embodiment of our invention is a process for the preparation of a copolyester, comprising:

reacting a diester composition comprising dimethyl terephthalate with a diol composition comprising a first diol component comprising 2,2,4,4-tetramethyl-1,3-cyclobutanediol and a second diol component comprising 1,4-cyclohexanedimethanol, the reaction comprising
(i) reacting the first diol component comprising about 100 mole percent of the 2,2,4,4-tetramethyl-1,3-cyclobutanediol, based on the total moles of 2,2,4,4-tetramethyl-1,3-cyclobutanediol in the diol composition, and 30 to about 80 mole percent of the 1,4-cyclohexanedimethanol, based on the total moles of 1,4-cyclohexanedimethanol in the diol composition, with the diester composition to form a polyester oligomer at a conversion of the 2,2,4,4-tetramethyl-1,3-cyclobutanediol at least 50 mole percent, based on the total moles of the 2,2,4,4-tetramethyl-1,3-cyclobutanediol in the diol composition;
(ii) reacting the second diol component comprising about 20 to about 70 mole percent the 1,4-cyclohexanedimethanol, based on the total moles of 1,4-cyclohexanedimethanol in the diol composition, with the polyester oligomer of step (i) form a modified polyester oligomer; and
(iii) heating the modified polyester oligomer to form a thermoplastic, random copolyester having an inherent viscosity of about 0.4 dL/g to about 1.0;
wherein the molar ratio of all diols in the diol composition to all diesters in the diester composition is about 1.1 to about 1.5.

The process of our invention may be carried out as a batch, semicontinuous, or continuous process and may employ 2 or more reactors. In addition to the diester and diol components, the process may include thermal stabilizers comprising various organophosphate esters and various catalysts, such as, for example, compounds of tin either alone or in combination with titanium, gallium, zinc, antimony, cobalt, manganese, magnesium, germanium, lithium, aluminum, compounds thereof, or aluminum compounds with lithium hydroxide or sodium hydroxide.

DETAILED DESCRIPTION

The present invention provides a process for the preparation of high molecular weight thermoplastic copolyesters from a diester composition comprising the dialkyl esters of terephthalic acid and a diol composition comprising 2,2,4,4-tetramethyl-1,3-cyclobutanediol ("TMCD") and 1,4-cyclohexanedimethanol ("CHDM"). Our process reduces the troublesome, in situ precipitation of PCT polymers and avoids the higher processing temperatures that are sometimes used to prevent the precipitation of PCT by reacting all or a portion of the TMCD with the diester to form a polyester oligomer and then reacting that polyester oligomer with all or a portion of the CHDM to form a modified polyester oligomer. The modified polyester oligomer can be polymerized further to form a thermoplastic copolyester. Thus, in a general embodiment, the present invention provides process for the preparation of a copolyester, comprising:

reacting a diester composition comprising at least one dialkyl terephthalic acid ester with a diol composition, the diol composition comprising a first diol component comprising 2,2,4,4-tetramethyl-1,3-cyclobutanediol and a second diol component comprising 1,4-cyclohexanedimethanol, the reaction comprising
(i) reacting the first diol component with the diester composition to form a polyester oligomer;
(ii) reacting the second diol component with the polyester oligomer of step (i) to form a modified polyester oligomer; and (iii) heating the modified polyester oligomer to form a thermoplastic, random copolyester having an inherent viscosity of about 0.4 dL/g to about 1.0; wherein the molar ratio of all diols in the diol composition to all diesters in the diester composition is about 1.2 to about 1.5.

Our process is useful for the preparation of copolyesters containing a wide range of terephthalic acid, TMCD, and CHDM content and inherent viscosities (abbreviated herein as "IV").

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, reference a "copolyester," or a "dicarboxylic acid ester," is intended to include the processing or making of a plurality of polymers, or dicarboxylic acid esters. For example, references to a composition containing or including "an" ingredient or "a" copolyester is intended to include other ingredients or other copolyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The process of the present invention is for the preparation of thermoplastic copolyesters comprising dicarboxylic acid monomer residues, diol monomer residues, and repeating units. Thus, the term "monomer residue", as used herein, means a residue of a dicarboxylic acid, a diol, or a hydroxy-carboxylic acid. A "repeating unit", as used herein, means an organic structure having 2 monomer residues bonded through a carbonyloxy group. The copolyesters of the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a copolyester containing 30 mole % of a monomer, which may be a dicarboxylic acid, a diol, or hydroxy-carboxylic acid, based on the total repeating units, means that the copolyester contains 30 mole % monomer out of a total of 100 mole % repeating units. Thus, there are 30 moles of monomer residues among every 100 moles of repeating units. Similarly, a copolyester containing 30 mole % of a dicarboxylic acid monomer, based on the total acid residues, means the copolyester contains 30 mole % dicarboxylic acid monomer out of a total of 100 mole % acid residues. Thus, in this latter case, there are 30 moles of dicarboxylic acid monomer residues among every 100 moles of acid residues.

The term "copolyester", as used herein, is intended to be synonymous with "polyester" and means a synthetic polymer prepared by the polycondensation of a diacid component, comprising one or more difunctional carboxylic acids or diesters, with a diol component, comprising one or more, difunctional hydroxyl compounds. The term "copolyester" is typically used to indicated polyesters prepared from at least 3 different monomer components. For example, a homopolyester is generally prepared from a single diacid component and a single diol component. By contrast, a copolyester, for example, may be prepared from a 2 or more diacid components and a single diol component or, in another example, from a single diacid component and 2 or more diol components. Typically the difunctional carboxylic acid is a dicarboxylic acid or diester and the difunctional hydroxyl compound is a dihydric alcohol such as, for example glycols and diols. Alternatively, the difunctional carboxylic acid may be a hydroxy carboxylic acid or ester such as, for example, p-hydroxybenzoic acid, and the difunctional hydroxyl compound may be a aromatic nucleus bearing 2 hydroxy substituents such as, for example, hydroquinone. The term "thermoplastic copolyester", as used herein, is intended to have its plain meaning as would be understood by persons having ordinary skill in the art, that is, a copolyester that softens when exposed to heat and returns to its original condition when cooled to room temperature. By the term "substantially linear", as used in the specification and the claims, it is meant that the copolyester contains 2 mole percent or less, based on the total moles of diol or diacid residues, of the residues of a branching agent. The term "residue", as used herein, means any organic structure incorporated into the polymer through a polycondensation reaction involving the corresponding monomer. Although the dicarboxylic acid residue may be derived from a dicarboxylic acid monomer or its associated acid halides, esters, salts, anhydrides, or mixtures thereof, the process of the instant invention pertains to the preparation of copolyesters from dicarboxylic acid diesters instead of the corresponding dicarboxylic acids. In one embodiment of the invention, for example, the diester component consists essentially of one or more dicarboxylic acid esters. In another embodiment, the diester component consists of one or more dicarboxylic acid diesters. As used herein, the term "dialkyl terephthalic acid ester" is synonymous with the term "dialkyl ester of terephthalic acid" and is understood to mean a diester of terephthalic acid formed by the esterification of both carboxylic acid groups of terephthalic acid with an alkyl alcohol.

The process of the instant invention comprises reacting a diester composition comprising at least one dialkyl terephthalic acid ester with a diol composition comprising a first diol component comprising 2,2,4,4-tetramethyl-1,3-cyclobutanediol and a second diol component comprising 1,4-cyclohexanedimethanol. In addition to a diester of terephthalic acid, the diester component, for example, may comprise one or more dicarboxylic acid diesters selected from naphthalenedicarboxylic acid, 1,4-cyclohexanedicarboxylic acid, isophthalic acid, and combinations thereof. Any of the various isomers of naphthalenedicarboxylic acid diesters or mixtures of isomers may be used, but the 1,4-, 1,5-, 2,6-, and 2,7- isomers are preferred. Also, 1,4-cyclohexanedicarboxylic acid diester may be present at the pure cis or trans isomer or as a mixture of cis and trans isomers. In addition to the dicarboxylic acid diesters listed above, the diester component may further comprise about one or more modifying dicarboxylic acid diesters. Examples of modifying dicarboxylic acid diesters include, but are not limited to, diesters of fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids. In one example, the diester composition may further comprise at least one dialkyl ester of isophthalic acid in addition to the diester of terephthalic acid.

The dialkyl ester can comprise the residues of a primary alcohol having from 1 to 8 carbon atoms. Examples of primary alcohols include, but are not limited to methyl, ethyl, propyl, isopropyl, butyl, isobutyl, pentyl, hexyl, and 2-ethylhexyl alcohol. For example, the diester composition may comprise about 100 mole percent dimethyl terephthalate, based on the total moles of diester in the diester composition.

The diol composition comprises a first diol component comprising 2,2,4,4-tetramethyl-1,3-cyclobutanediol and a second diol component comprising 1,4-cyclohexanedimethanol. The CHDM and TMCD may be used as a pure cis or trans isomer or as a mixture of cis and trans isomers. In addition to CHDM and TMCD, the process of the invention may further comprise reacting one or more diols selected from neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, polyalkylene glycol, and combinations thereof with the polyester oligomer or modified polyester oligomer.

Typically, the copolyester process of the invention will comprise a transesterification reaction, which may be carried out, at least in part, during steps (i) and (ii) of the instant process, and a polymerization reaction, which may be carried out, at least in part, during step (iii) of the instant process. The transesterication and polymerization reactions generally are carried out at different ranges of temperatures and pressures. In the transesterification reaction, the diol and diester compositions are transesterified to form a low molecular weight polymer or oligomer and the alcohol corresponding to the diester as a byproduct. The majority of the alcohol by-product is removed from the reaction zone during the esterification stage. The term "oligomer", as used herein, is understood to mean a low molecular weight polymer or prepolymer containing relatively few repeating units. Typically, the oligomer will have an IV of less than 0.4 dL/g. In the process of the invention, the addition of the diol composition to the diester composition usually is completed during the transesterification step. Transesterification generally occurs rapidly as the diol and diester compositions are contacted at elevated temperatures in the reaction zone. Generally, the alcohol by-product is removed from the reaction zone continuously by distillation as the reaction occurs. The specific transesterification conditions may vary with the number and type of diester and diol components added and the point of reaction at which each component is added. For example, for copolyesters prepared from DMT, DMI, TMCD, and CHDM, the transesterification can be conducted at temperatures between 180° C. and 270° C. at an absolute pressure of about 45 kPa to about 550 kPa. The diol composition typically is added during the transesterification step of the process. The transesterification step can continue by heating diol and diester components after all of the diester and diol components are added to the reaction zone. For example, transesterification stage of the process can be carried out by heating the diol and diester components at temperature of about 210 to about 290° C. at an absolute pressure of about 45 kPa to about 550 kPa after the addition of the diester or diol components is completed while removing a alcohol by-product. In another example, the diester and diol components can be heated at a temperature of about 210° C. to about 280° C. In yet another example, the diester and diol components can be heated at a temperature of about 220 to about 270° C.

Our copolyester process is carried out by reacting the diester composition, comprising at least one dialkyl terephthalic acid ester, with a diol composition comprising a first diol component comprising 2,2,4,4-tetramethyl-1,3-cyclobutanediol ("TMCD") and a second diol component comprising 1,4-cyclohexanedimethanol diester ("CHDM"). To reduce the excessive formation and precipitation of PCT polymers from the reaction of CHDM with terephthalate esters, the TMCD is allowed to react preferentially with the diester composition, typically under transesterification conditions, by withholding all or a portion of the total CHDM charge during the initial stage of the reaction. Thus, the reaction comprises: (i) reacting the diester composition with the first diol component to form a polyester oligomer; (ii) reacting the polyester oligomer with the second diol component to form a modified polyester oligomer; and (iii) heating the modified polyester oligomer to form a random, thermoplastic copolyester. The reaction with the diester component in step (i) may comprise all or a portion of the diester composition. Typically, the IV of the copolyester produced by the invention is in the range of about 0.4 to about 1.0 dL/g.

As noted above, steps (i) and (ii) typically are carried out under transesterification conditions at a temperature of about 180 to about 270° C. and at an absolute pressure of about 45 kPa to about 550 kPa. Step (iii), typically, can be conducted under polycondensation or polymerization conditions at a temperature of about 220 to about 290° C. and at an absolute pressure of about 0.001 kPa to about 55 kPa after the addition of the first and second diol components is completed.

The proportions of TMCD and CHDM within the first and second diol components can vary considerably provided that the first diol component comprises TMCD and the second diol component comprises CHDM. For example, the first diol component can comprises about 50 to about 100 mole percent of the 2,2,4,4-tetramethyl-1,3-cyclobutanediol, based on the total moles of 2,2,4,4-tetramethyl-1,3-cyclobutanediol in the diol composition, and 0 to about 80 mole percent of the 1,4-cyclohexanedimethanol, based on the total moles of 1,4-cyclohexanedimethanol the diol composition. The term "total moles", as used herein with respect to TMCD or CHDM, is intended mean the total moles of either TMCD or CHDM added to the copolyester reaction mixture over the course of the entire copolyester process. For example, if a diol composition comprising a total of 10 moles of TMCD is used to produce a copolyester and the first diol component comprises 50 mole percent of that TMCD, based on the total moles of TMCD in the diol composition, then the first diol component comprises 5 moles of TMCD. Other examples of mole percentages of TMCD within the first diol component are 55, 60, 65, 70, 75, 80, 85, 90, and 95 mole percent, based on the total moles of TMCD in the diol composition. Further examples of mole percentages of CHDM within the first diol component are 5, 10, 15, 20, 25, 30, 35, 40, 45, 50, 55, 60, 65, 70, and 75 mole percent, based on the total moles of CHDM in the diol composition. In one embodiment, for example, the first diol component can comprise about 100 mole percent 2,2,4,4-tetramethyl-1,3-cyclobutanediol, based on the total moles of TMCD in the diol composition, and about 30 to about 80 mole percent of 1,4-cyclohexanedimethanol, based on the total CHDM in the diol composition.

The second diol component can comprise about 20 to about 100 mole percent of the 1,4-cyclohexanedimethanol, based on the total moles of 1,4-cyclohexanedimethanol in diol composition, and 0 to about 50 mole percent of the 2,2,4,4-tetramethyl-1,3-cyclobutanediol, based on the total moles of 2,2,4,4-tetramethyl-1,3-cyclobutanediol in the diol composition. Additional examples of mole percentages of CHDM in the second diol component, based on the total moles of CHDM in the diol composition, are 25, 30, 35, 40, 45, 50, 55, 60, 65, 70, 75, 80, 85, 90, and 95 mole percent. Additional examples of mole percentages of TMCD in the second diol component, based on the total moles of TMCD in the diol composition, are 5, 10, 15, 20, 25, 30, 35, 40, and 45 mole percent. In an additional example, the second diol component can comprise about 20 to about 70 mole percent of the 1,4-cyclohexanedimethanol, based on the total moles of CHDM in the diol composition.

In one embodiment, the molar ratio of all diols in the diol composition to all diesters in the diester composition is about 1.2 to about 1.5. Broader ranges of diol:diester molar ratios such as, for example, about 1.1 to about 1.5 can be used when the conversion of the TMCD to polyester oligomer in step (i) of the reaction is at least 50 mole percent, based on the total moles of TMCD in the diol composition. For example, if a total of 10 moles of TMCD is used in the process and 6 moles of TMCD are converted to polyester oligomer during step (i) before the addition of the second diol component, then the conversion of TMCD to polyester oligomer would be 60 mole percent. The extent of conversion of TMCD to polyester oligomer can be determined by methods well-known to persons skilled in the art. For example, the conversion of TMCD may be determined by measuring the amount of TMCD that has reacted during step (i) by proton nuclear magnetic resonance using peak integration methods well-known to persons of ordinary skill in the art. Alternatively, the conversion of TMCD can be determined by measuring the amount of unreacted TMCD by gas chromatography, again using methods well known in the art. Other, non-limiting examples of total diol:diester molar ratios are about 1.15 to about 1.45, about 1.15 to about 1.40, about 1.15 to about 1.35, about 1.15 to about 1.3, about 1.15 to about 1.25, about 1.15 to about 1.2, about 1.2 to about 1.45; about 1.2 to about 1.4, about 1.2 to about 1.35, about 1.2 to about 1.3, and about 1.2 to about 1.25. Some additional, specific examples of total diol:diester molar ratios which may be used in the process of the invention are 1.1, 1.12, 1.13, 1.15, 1.17, 1.20, 1.22, 1.25, 1.27, 1.30, 1.32, 1.35, 1.37, 1.40, 1.43, 1.45, and 1.50.

The reaction of the diester composition with the first and second diol composition can be carried out incrementally. For example, in one embodiment of our inventive process, the process may further comprise adding the first diol component incrementally to the diester composition in step (i), adding the second diol component incrementally to the polyester oligomer in step (ii), or a combination thereof. The term "incrementally", as used herein, is intended to have its plain meaning of contacting the diester composition, the first diol component, the second diol component, or any combination thereof, under reaction conditions in one or more increments or portions. For example, the diester composition can be added incrementally to a reaction zone simultaneously with the first diol component. In another example, the first diol component can be added incrementally to a reaction zone containing the diester composition. The increments do not have to be equal in size. For example, one increment may contain 90% of the total amount of the first or second diol component and a second increment may contain the remaining 10%. The increments may be added stepwise in discrete portions, continuously, or in a combination thereof. Therefore, the term "incrementally", as used in the description and claims, is intended to include both continuous and stepwise additions of the first or second diol components. Thus, "incrementally" means that, over the duration of the entire process, the diol components can be added to the reaction zone continuously, stepwise in 2 or more stages or discrete steps, or in a combination of continuous and stepwise addition. Hence, in one embodiment of the invention, the addition of the first and second diol components in step (i) and (ii) each are carried out in 2 or more stages. In another embodiment, the addition of the first and second diol components in step (i) and (ii) each are carried out continuously.

For example, the first diol component, containing all or a portion of the TMCD and, optionally, a portion of the CHDM, can be added continuously to a reaction zone containing the diester component under transesterification conditions, i.e., typically at a temperature of about 180 to about 270° C., to form a polyester oligomer. The second diol component, containing all or any remaining portion of the CHDM not present in the first diol component and any remaining portion of TMCD not present in the first diol component then can be added either continuously or in one or more discrete steps. In another example, in a reaction involving dimethyl terephthalate (DMT), dimethyl isophthalate acid (DMI), and 1,4-cyclohexanedimethanol and 2,2,4,4-tetramethyl-1,3-cyclobutanediol at a total diol:diester molar ratio of 1.20, all of the DMT, DMI, and TMCD and one-half of the CHDM is charged initially to the reactor at a diol:diester molar ratio of about 1 or less. This mixture can be reacted for a period of time to form a copolyester reaction mixture containing a polyester oligomer. The remaining CHDM then can be fed to the reactor in 2 or more stages such that at the end of the addition, the molar ratio of the total amount of diol and diester component added to the reactor is about 1.2. In another embodiment, the process may be carried out in a series of batch or continuous reactors, wherein a portion of one or more of DMT, DMI, TMCD, and CHDM may be added to the first reactor and the remaining portion(s) added to a subsequent reactor downstream in the process. The diester and diol components may be added separately or as a slurry mixture, provided that the slurry components have no deleterious effect upon the process or can be removed easily. For example, the diester component may be added as a mixture in water; an alcohol such as methanol, propanol, butanol, and isopropanol; a hydrocarbon such as toluene and xylene; or in one or more diols.

As noted above, the reaction pressure during the steps (i) and (ii) may be from about 45 kPa absolute (about 7 psia) to about 550 kPa absolute (about 80 psia). Actual pressures used will depend upon the esterification temperature used and the diol and diester compositions. The time for the esterification step will depend upon temperature, pressure, the nature and amount of diol and diester components added to the esterification stage and when each component is added. For example, the total residence time for the transesterification part of the instant process, i.e., steps (i) and (ii) can vary between 120 minutes and 600 minutes. Some additional examples of residence times include but are not limited to 150, 180, 210, 240, 270, 300, 330, 360, 390, 420, 450, 480, 510, 540, and 570 minutes.

The process of the invention may be carried out by continuous, semi-continuous, and batch modes of operation and may utilize a reaction zone comprising a variety of reactor types. Examples of suitable reactor types include, but are not limited to, stirred tank, continuous stirred tank, slurry, tubular, wiped-film, falling film, or extrusion reactors. The reaction zone, for example, may comprise 2 or more reactors which, typically, are arranged in a series configuration. In another example, the reaction zone may comprise 2, 3, 4, 5, or 6 reactors in series or in parallel. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all or a portion of the reactants are added to the reactor and then processed according to a predetermined course of reaction during which additional reactants may be fed to but no polymer is removed from the reactor. The term "semicontinuous" means a process where some of the reactants are charged at the beginning of the process and the remaining reactants are fed continuously as the reaction progresses. Alternatively, a semicontinuous process may also include a process similar to a batch process in which all or a portion of the reactants are added at the beginning of the process except that one or more of the products are removed continuously as the reaction progresses. Typically, on a commercial scale, the process may be operated as a continuous process for economic reasons and to reduce color formation and thermal degradation of the polymer as the copolyester may deteriorate in appearance if allowed to reside in a reactor at an elevated temperature for too long a duration.

According to the invention, step (ii) of the instant process produces a low molecular weight, modified polyester oligomer that may be reacted further in a second, polymerization stage in step (iii) usually under vacuum and at higher temperatures to produce a thermoplastic, random copolyester having the desired degree of polymerization, as determined by inherent viscosity. For the process of the invention, the copolyester from the polymerization stage will have an IV of at least 0.4 dL/g. The conditions of polymerization stage may vary with the number and type of acid and diol components added and the diol-to-diester mole ratio used. For example, after the addition of the diol components, step (iii) may be conducted at temperatures at about 220° C. to about 290° C. at typical reaction pressures of from about 0.001 kPa absolute to about 55 kPa absolute. Additional temperature ranges for the polymerization step can be from about 240° C. to about 290° C. and about 250° C. to about 280° C. Stirring or appropriate conditions may be used in both the transesterification and polymerization steps to ensure adequate heat transfer and surface renewal of the reaction mixture. During the polymerization stage, additional water from continued esterification of the oligomer may be removed by distillation along with small amounts of diol. Typically, the polymerization step is carried out until the polyester has attained an IV of at least 0.4 to about 1.0 dL/g, although higher IV's of about 1.05, about 1.1, about 1.15, and about 1.2 also may be obtained.

The reactions of both steps may be catalyzed by appropriate catalysts such as, for example, various compounds of titanium, tin, antimony, germanium, and mixtures thereof. Examples of typical catalysts include, but are not limited to, alkoxy titanium compounds, alkali metal hydroxides and alcoholates, salts of organic carboxylic acids, alkyl tin compounds, metal oxides, and the like. In one aspect, any of the processes of the invention may comprise at least one tin compound and, optionally, at least one catalyst chosen from titanium, gallium, zinc, antimony, cobalt, manganese, magnesium, germanium, lithium, aluminum compounds and an aluminum compound with lithium hydroxide or sodium hydroxide. Typically, the catalyst is present in the range of 1 to 500 ppm. Examples of catalysts useful in the present invention include, but are not limited to, one of more of the following: butyltin tris-2-ethylhexanoate, dibutyltin diacetate, dibutyltin oxide, and dimethyl tin oxide. A phosphorus compound inhibitor may optionally be used. For example, the catalyst may comprise at least one tin compound. In another embodiment, any of the processes of making the copolyesters useful in the invention may be prepared using a catalyst comprising at least one tin compound and at least one titanium compound.

The process of the invention, in certain cases, may benefit from the presence of a thermal stabilizer comprising a phosphorus compound. For example, the phosphorus compounds useful as thermal stabilizers can comprise phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. In one aspect, for example, the thermal stabilizer can comprise at least one compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed alkyl aryl phosphites, reaction products thereof, and mixtures thereof. The phosphate esters include esters in which the phosphoric acid is fully esterified or only partially esterified. In yet another aspect, the thermal stabilizer may comprise use of triphenyl phosphate and/or Merpol A. In yet another aspect, the thermal stabilizer of the invention may comprise triphenyl phosphate.

The copolyester produced by our process typically can comprise about 60 to 100 mole percent, based on the total moles of diacid residues, of the residues of terephthalic acid, isophthalic acid, or combinations thereof; and about 10 to about 90 mole percent, based on the total moles of diol residues, of the residues 1,4-cyclohexanedimethanol and about 10 to about 90 mole percent of the residues of 2,2,4,4-tetramethyl-1,3-cyclobutanediol. The CHDM and TMCD may be used as a pure cis or trans isomer or as a mixture of cis and trans isomers. In addition to CHDM and TMCD, the copolyester may comprise from about 0 to about 80 mole percent of the residues of one or more diols selected from neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2, 4,4-tetramethyl-1,3-cyclobutanediol, 1,3-cyclohexanedimethanol, bisphenol A, polyalkylene glycol, and combinations thereof.

For example, the thermoplastic copolyester can comprise about 80 to 100 mole percent, based on the total diacid residues, of the residues of terephthalic acid and about 85 to greater than 50 mole percent, based on the total diol residues, of the residues of 1,4-cyclohexanedimethanol and about 15 to less than 50 mole percent of the residues of 2,2,4,4-tetramethyl-1,3-cyclobutanediol. In another example, the copolyester may comprise (a) diacid residues comprising about 70 to about 100 mole percent of the residues of terephthalic acid, 0 to 30 mole percent of the residues of at least one aromatic dicarboxylic acid having up to 20 carbon atoms, and 0 to about 10 mole percent of the residues of at least one aliphatic dicarboxylic acid having up to 16 carbon atoms; and (b) diol residues comprising about 20 to about 40 mole percent of the residues of 2,2,4,4-tetramethyl-1,3-cyclobutanediol, and about 60 to about 80 mole percent of the residues of 1,4-cyclohexanedimethanol. In another example, the copolyester may comprise about 95 mole percent of the residues of terephthalic acid and about 5 mole percent of the residues of isophthalic acid. In yet another example, the copolyester may comprise about 100 mole percent of the residues of terephthalic acid. Some additional examples of copolyester compositions which may be produced by the process of the invention are those comprising diacid residues comprising about 70 to about 100 mole percent of the residues of terephthalic acid, 0 to about 30 mole percent of the residues of at least one aromatic dicarboxylic acid having up to 20 carbon atoms, and 0 to about 10 mole percent of the residues of at least one aliphatic dicarboxylic acid having up to 16 carbon atoms; and diol residues comprising (a) about 20 to about 35 mole percent of the residues of 2,2,4,4-tetramethyl-1,3-cyclobutanediol, and about 65 to about 80 mole percent of the residues of 1,4-cyclohexanedimethanol; (b) about 30 to about 40 mole percent of the residues of 2,2,4,4-tetramethyl-1,3-cyclobutanediol, and about 60 to about 70 mole percent of the residues of 1,4-cyclohexanedimethanol; (c) about 20 to about 25 mole percent of the residues of 2,2,4,4-tetramethyl-1,3-cyclobutanediol, and about 75 to about 80 mole percent of the residues of 1,4-cyclohexanedimethanol: (d) about 30 to about 35 mole percent of the residues of 2,2,4,4-tetramethyl-1,3-cyclobutanediol, and 65 to 70 mole percent of the residues of 1,4-cyclohexanedimethanol.

The copolyesters prepared by the process of this invention also may contain other conventional additives and ingredients which do not deleteriously affect their end use. For example, additives such as fillers, surface friction modifiers, light and heat stabilizers, extrusion aids, antistatic agents, colorants, dyes, pigments, fluorescent brighteners, antimicrobials, anti-counterfeiting markers, hydrophobic and hydrophilic enhancers, viscosity modifiers, slip agents, tougheners, adhesion promoters, and the like may be used. Colorants, sometimes referred to as toners, may be added to impart a desired neutral hue and/or brightness to the copolyester. When colored copolyesters are desired, pigments or colorants may be included in the copolyester reaction mixture during the reaction of the diol and the diester components or they may be melt blended with the copolyester after completion of the process. A preferred method of including colorants is to use a colorant having thermally stable organic colored compounds with reactive groups such that the colorant is copolymerized and incorporated into the copolyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the copolyester reaction process after the direct esterification reaction.

The polyesters and/or the polycarbonates useful in the polyester compositions of the invention can comprise residues of at least one branching monomer, also referred to herein as a branching agent, having 3 or more carboxyl substituents, hydroxyl substituents, or a combination thereof. Conventional branching agents include, but are not limited to, polyfunctional acids, anhydrides, alcohols and mixtures thereof. Small amounts of a branching agent are useful in increasing the melt strength and melt viscosity of the polymers.

In one embodiment, branching agents may comprise, for example, from 0 to 10 mole percent, from 0.01 to 5 mole percent, from 0.01 to 1 mole percent, from 0.05 to 5 mole percent, from 0.05 to 1 mole percent, from 0.1 to 0.7 mole percent, or 0.1 to 0.5 mole percent, based the total mole percentages of either the diol or diacid residues, respectively, of one or more residues of a branching monomer.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the copolyester reaction mixture or blended with the copolyester in the form of a concentrate as described, for example, in U.S. Pat. Nos. 5,654,347 and 5,696,176.

The copolyesters of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the copolyester.

The process(es) of the invention may be used to prepare copolyesters from the reaction of DMT, CHDM, and TMCD. In one aspect, the process(es) of the invention can be used to manufacture a copolyester composition comprising:

(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and (b) a diol component comprising:
- (i) 2,2,4,4-tetramethyl-1,3-cyclobutanediol residues; and
- (ii) cyclohexanedimethanol residues; and (II) at least one thermal stabilizer chosen from at least one of alkyl phosphate esters, aryl phosphate esters, mixed alkyl aryl phosphate esters, reaction products thereof, and mixtures thereof.

In one aspect, the process(es) of the invention can be used to manufacture a copolyester composition comprising (I) at least one copolyester which comprises:
- (a) a dicarboxylic acid component comprising:
  - (i) 70 to 100 mole % of terephthalic acid residues;
  - (ii) 0 to 30 mole % of the residues of at least one aromatic dicarboxylic acid having up to 20 carbon atoms; and
  - (iii) 0 to 10 mole % of the residues of at least one aliphatic dicarboxylic acid having up to 16 carbon atoms; and
- (b) a diol component comprising:
  - (i) 1 to 99 mole % of 2,2,4,4-tetramethyl-1,3-cyclobutanediol residues; and
  - (ii) 1 to 99 mole % of cyclohexanedimethanol residues; and (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.4 to 1.0 dL/g as determined in 60/40 (wt/wt) phenol/tetrachloroethane at a concentration of 0.25 g/50 ml at 25° C.; and wherein the copolyester has a Tg from 85 to 200° C.

In one aspect, the process(es) of the invention can be used to manufacture a copolyester composition comprising:
(I) at least one copolyester which comprises:
- (a) a dicarboxylic acid component comprising:
  - (i) 70 to 100 mole % of terephthalic acid residues;
  - (ii) 0 to 30 mole % of the residues of at least one aromatic dicarboxylic acid having up to 20 carbon atoms; and
  - (iii) 0 to 10 mole % of the residues of at least one aliphatic dicarboxylic acid having up to 16 carbon atoms; and
- (b) a diol component comprising:
  - (i) 5 to less than 50 mole % of 2,2,4,4-tetramethyl-1,3-cyclobutanediol residues; and
  - (ii) greater than 50 to 95 mole % of cyclohexanedimethanol residues; and (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.50 to 1.0 dL/g as determined in 60/40 (wt/wt) phenol/tetrachloroethane at a concentration of 0.25 g/50 ml at 25° C.; and wherein the copolyester has a Tg from 85 to 120° C.

In one aspect, the process(es) of the invention can be used to manufacture a copolyester composition comprising:
(I) at least one copolyester which comprises:
- (a) a dicarboxylic acid component comprising:
  - (i) 70 to 100 mole % of terephthalic acid residues;
  - (ii) 0 to 30 mole % of the residues of at least one aromatic dicarboxylic acid having up to 20 carbon atoms; and
  - (iii) 0 to 10 mole % of the residues of at least one aliphatic dicarboxylic acid having up to 16 carbon atoms; and
- (b) a diol component comprising:
  - (i) 10 to 30 mole % of 2,2,4,4-tetramethyl-1,3-cyclobutanediol residues; and
  - (ii) 70 to 90 mole % of cyclohexanedimethanol residues; and (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.50 to 1.0 dL/g as determined in 60/40 (wt/wt) phenol/tetrachloroethane at a concentration of 0.25 g/50 ml at 25° C.; and wherein the copolyester has a Tg from 85 to 120° C. In one embodiment, the Tg of the copolyester is from 100 to 120° C.

In one aspect, the process(es) of the invention can be used to manufacture a copolyester composition comprising:
(I) at least one copolyester which comprises:
- (a) a dicarboxylic acid component comprising:
  - (i) 70 to 100 mole % of terephthalic acid residues;
  - (ii) 0 to 30 mole % of the residues of at least one aromatic dicarboxylic acid having up to 20 carbon atoms; and
  - (iii) 0 to 10 mole % of the residues of at least one aliphatic dicarboxylic acid having up to 16 carbon atoms; and
- (b) a diol component comprising:
  - (i) 15 to 25 mole % of 2,2,4,4-tetramethyl-1,3-cyclobutanediol residues; and
  - (ii) 75 to 85 mole % of cyclohexanedimethanol residues; and (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity is from 0.50 to 1.0 dL/g as determined in 60/40 (wt/wt) phenol/tetrachloroethane at a concentration of 0.25 g/50 ml at 25° C.; and wherein the copolyester has a Tg from 85 to 120° C. In one embodiment, the Tg of the copolyester is from 100 to 120° C.

In one aspect, the process(es) of the invention can be used to manufacture a copolyester composition comprising:
(I) at least one copolyester which comprises:
- (a) a dicarboxylic acid component comprising:
  - (i) 70 to 100 mole % of terephthalic acid residues;
  - (ii) 0 to 30 mole % of the residues of at least one aromatic dicarboxylic acid having up to 20 carbon atoms; and
  - (iii) 0 to 10 mole % of the residues of at least one aliphatic dicarboxylic acid having up to 16 carbon atoms; and
- (b) a diol component comprising:
  - (i) 15 to 25 mole % of 2,2,4,4-tetramethyl-1,3-cyclobutanediol residues; and
  - (ii) 75 to 85 mole % of cyclohexanedimethanol residues; and (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity is from 0.50 to 0.75 dL/g as determined in 60/40 (wt/wt) phenol/tetrachloroethane at a concentration of 0.25 g/50 ml at 25° C.; and wherein the copolyester has a Tg from 85 to 120° C. In one embodiment, the Tg of the copolyester is from 100 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 5 to less than 50 mole % of 2,2,4,4-tetramethyl-1,3-cyclobutanediol residues; and
    (ii) greater than 50 to 95 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.50 to 0.75 dL/g as determined in 60/40 (wt/wt) phenol/tetrachloroethane at a concentration of 0.25 g/50 ml at 25° C.; and wherein the copolyester has a Tg from 85 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 5 to less than 50 mole % of 2,2,4,4-tetramethyl-1,3-cyclobutanediol residues; and
    (ii) greater than 50 to 95 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.60 to 0.75 dL/g as determined in 60/40 (wt/wt) phenol/tetrachloroethane at a concentration of 0.25 g/50 ml at 25° C.; and wherein the copolyester has a Tg from 85 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 10 to 30 mole % of 2,2,4,4-tetramethyl-1,3-cyclobutanediol residues; and
    (ii) 70 to 90 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.5 to 0.8 dL/g as determined in 60/40 (wt/wt) phenol/tetrachloroethane at a concentration of 0.25 g/50 ml at 25° C.; and wherein the copolyester has a Tg from 85 to 120° C. In one embodiment, the Tg of the copolyester is from 100 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 10 to 30 mole % of 2,2,4,4-tetramethyl-1,3-cyclobutanediol residues; and
    (ii) 70 to 90 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.50 to 0.75 dL/g as determined in 60/40 (wt/wt) phenol/tetrachloroethane at a concentration of 0.25 g/50 ml at 25° C.; and wherein the copolyester has a Tg from 85 to 120° C. In one embodiment, the Tg of the copolyester is from 100 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and (b) a diol component comprising:
  (i) 17 to 28 mole % of 2,2,4,4-tetramethyl-1,3-cyclobutanediol residues; and
  (ii) 72 to 83 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.65 to 0.75 dL/g as determined in 60/40 (wt/wt) phenol/tetrachloroethane at a concentration of 0.25 g/50 ml at 25° C.; and wherein the copolyester has a Tg from 85 to 120° C. In one embodiment, the Tg of the copolyester is from 100 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 25 to 35 mole % of 2,2,4,4-tetramethyl-1,3-cyclobutanediol residues;
    (ii) 65 to 75 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.40 to 1.0 dL/g as determined in 60/40 (wt/wt) phenol/tetrachloroethane at a concentration of 0.25 g/50 ml at 25° C.; and wherein the copolyester has a Tg from 110 to 123° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 25 to 35 mole % of 2,2,4,4-tetramethyl-1,3-cyclobutanediol residues;
    (ii) 65 to 75 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.40 to 1.0 dL/g as determined in 60/40 (wt/wt) phenol/tetrachloroethane at a concentration of 0.25 g/50 ml at 25° C.; and wherein the copolyester has a Tg from 110 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 25 to 35 mole % of 2,2,4,4-tetramethyl-1,3-cyclobutanediol residues;
    (ii) 65 to 75 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.72 dL/g as determined in 60/40 (wt/wt) phenol/tetrachloroethane at a concentration of 0.25 g/50 ml at 25° C.; and wherein the copolyester has a Tg from 110 to 123° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 25 to 35 mole % of 2,2,4,4-tetramethyl-1,3-cyclobutanediol residues;
    (ii) 65 to 75 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 110 to 130° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and (b) a diol component comprising:
(i) 28 to 38 mole % of 2,2,4,4-tetramethyl-1,3-cyclobutanediol residues;
(ii) 62 to 72 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.5 to 1.0 dL/g as determined in 60/40 (wt/wt) phenol/tetrachloroethane at a concentration of 0.25 g/50 ml at 25° C.; and wherein the copolyester has a Tg from 110 to 130° C.

In one aspect, the process(es) of the invention can be used to manufacture a copolyester composition comprising:
(I) at least one copolyester which comprises:
    (a) a dicarboxylic acid component comprising:
        (i) 70 to 100 mole % of terephthalic acid residues;
        (ii) 0 to 30 mole % of the residues of at least one aromatic dicarboxylic acid having up to 20 carbon atoms; and
        (iii) 0 to 10 mole % of the residues of at least one aliphatic dicarboxylic acid having up to 16 carbon atoms; and
    (b) a diol component comprising:
        (i) 28 to 38 mole % of 2,2,4,4-tetramethyl-1,3-cyclobutanediol residues;
        (ii) 62 to 72 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.72 dL/g as determined in 60/40 (wt/wt) phenol/tetrachloroethane at a concentration of 0.25 g/50 ml at 25° C.; and wherein the copolyester has a Tg from 110 to 130° C.

In one aspect, the process(es) of the invention can be used to manufacture a copolyester composition comprising:
(I) at least one copolyester which comprises:
    (a) a dicarboxylic acid component comprising:
        (i) 70 to 100 mole % of terephthalic acid residues;
        (ii) 0 to 30 mole % of the residues of at least one aromatic dicarboxylic acid having up to 20 carbon atoms; and
        (iii) 0 to 10 mole % of the residues of at least one aliphatic dicarboxylic acid having up to 16 carbon atoms; and
    (b) a diol component comprising:
        (i) 28 to 38 mole % of 2,2,4,4-tetramethyl-1,3-cyclobutanediol residues;
        (ii) 62 to 72 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 110 to 130° C.

In one aspect, the process(es) of the invention can be used to manufacture a copolyester composition comprising:
(I) at least one copolyester which comprises:
    (a) a dicarboxylic acid component comprising:
        (i) 70 to 100 mole % of terephthalic acid residues;
        (ii) 0 to 30 mole % of the residues of at least one aromatic dicarboxylic acid having up to 20 carbon atoms; and
        (iii) 0 to 10 mole % of the residues of at least one aliphatic dicarboxylic acid having up to 16 carbon atoms; and
    (b) a diol component comprising:
        (i) 28 to 38 mole % of 2,2,4,4-tetramethyl-1,3-cyclobutanediol residues;
        (ii) 62 to 72 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 110 to 120° C.

In one aspect, the process(es) of the invention can be used to manufacture a copolyester composition comprising:
(I) at least one copolyester which comprises:
    (a) a dicarboxylic acid component comprising:
        (i) 70 to 100 mole % of terephthalic acid residues;
        (ii) 0 to 30 mole % of the residues of at least one aromatic dicarboxylic acid having up to 20 carbon atoms; and
        (iii) 0 to 10 mole % of the residues of at least one aliphatic dicarboxylic acid having up to 16 carbon atoms; and
    (b) a diol component comprising:
        (i) 30 to 35 mole % of 2,2,4,4-tetramethyl-1,3-cyclobutanediol residues;
        (ii) 65 to 70 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.72 dL/g as determined in 60/40 (wt/wt) phenol/tetrachloroethane at a concentration of 0.25 g/50 ml at 25° C.; and wherein the copolyester has a Tg from 110 to 130° C.

In one aspect, the process(es) of the invention can be used to manufacture a copolyester composition comprising:
(I) at least one copolyester which comprises:
    (a) a dicarboxylic acid component comprising:
        (i) 70 to 100 mole % of terephthalic acid residues;
        (ii) 0 to 30 mole % of the residues of at least one aromatic dicarboxylic acid having up to 20 carbon atoms; and
        (iii) 0 to 10 mole % of the residues of at least one aliphatic dicarboxylic acid having up to 16 carbon atoms; and (b) a diol component comprising:
  (i) 30 to 35 mole % of 2,2,4,4-tetramethyl-1,3-cyclobutanediol residues;
  (ii) 65 to 70 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.72 dL/g as determined in 60/40 (wt/wt) phenol/tetrachloroethane at a concentration of 0.25 g/50 ml at 25° C.; and wherein the copolyester has a Tg from 110 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 30 to 35 mole % of 2,2,4,4-tetramethyl-1,3-cyclobutanediol residues;
    (ii) 65 to 70 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 110 to 130° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 30 to 35 mole % of 2,2,4,4-tetramethyl-1,3-cyclobutanediol residues;
    (ii) 65 to 70 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 110 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 30 to 35 mole % of 2,2,4,4-tetramethyl-1,3-cyclobutanediol residues;
    (ii) 65 to 70 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 114 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 31 to 35 mole % of 2,2,4,4-tetramethyl-1,3-cyclobutanediol residues;
    (ii) 65 to 69 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 110 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and (b) a diol component comprising:
(i) 31 to 35 mole % of 2,2,4,4-tetramethyl-1,3-cyclobutanediol residues;
(ii) 65 to 69 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 114 to 120° C.

In one aspect, the process(es) of the invention can be used to manufacture a copolyester composition comprising:
(I) at least one copolyester which comprises:
(a) a dicarboxylic acid component comprising:
(i) 70 to 100 mole % of terephthalic acid residues;
(ii) 0 to 30 mole % of the residues of at least one aromatic dicarboxylic acid having up to 20 carbon atoms; and
(iii) 0 to 10 mole % of the residues of at least one aliphatic dicarboxylic acid having up to 16 carbon atoms; and
(b) a diol component comprising:
(i) 30 to 40 mole % of 2,2,4,4-tetramethyl-1,3-cyclobutanediol residues;
(ii) 60 to 70 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.72 dL/g as determined in 60/40 (wt/wt) phenol/tetrachloroethane at a concentration of 0.25 g/50 ml at 25° C.; and wherein the copolyester has a Tg from 110 to 130° C.

In one aspect, the process(es) of the invention can be used to manufacture a copolyester composition comprising:
(I) at least one copolyester which comprises:
(a) a dicarboxylic acid component comprising:
(i) 70 to 100 mole % of terephthalic acid residues;
(ii) 0 to 30 mole % of the residues of at least one aromatic dicarboxylic acid having up to 20 carbon atoms; and
(iii) 0 to 10 mole % of the residues of at least one aliphatic dicarboxylic acid having up to 16 carbon atoms; and
(b) a diol component comprising:
(i) 30 to 40 mole % of 2,2,4,4-tetramethyl-1,3-cyclobutanediol residues;
(ii) 60 to 70 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.72 dL/g as determined in 60/40 (wt/wt) phenol/tetrachloroethane at a concentration of 0.25 g/50 ml at 25° C.; and wherein the copolyester has a Tg from 110 to 120° C.

In one aspect, the process(es) of the invention can be used to manufacture a copolyester composition comprising:
(I) at least one copolyester which comprises:
(a) a dicarboxylic acid component comprising:
(i) 70 to 100 mole % of terephthalic acid residues;
(ii) 0 to 30 mole % of the residues of at least one aromatic dicarboxylic acid having up to 20 carbon atoms; and
(iii) 0 to 10 mole % of the residues of at least one aliphatic dicarboxylic acid having up to 16 carbon atoms; and
(b) a diol component comprising:
(i) 30 to 40 mole % of 2,2,4,4-tetramethyl-1,3-cyclobutanediol residues;
(ii) 60 to 70 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.68 dL/g as determined in 60/40 (wt/wt) phenol/tetrachloroethane at a concentration of 0.25 g/50 ml at 25° C.; and wherein the copolyester has a Tg from 110 to 120° C.

In one aspect, the process(es) of the invention can be used to manufacture a copolyester composition comprising:
(I) at least one copolyester which comprises:
(a) a dicarboxylic acid component comprising:
(i) 70 to 100 mole % of terephthalic acid residues;
(ii) 0 to 30 mole % of the residues of at least one aromatic dicarboxylic acid having up to 20 carbon atoms; and
(iii) 0 to 10 mole % of the residues of at least one aliphatic dicarboxylic acid having up to 16 carbon atoms; and
(b) a diol component comprising:
(i) 20 to 35 mole % of 2,2,4,4-tetramethyl-1,3-cyclobutanediol residues;
(ii) 65 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.55 to 0.80 dL/g as determined in 60/40 (wt/wt) phenol/tetrachloroethane at a concentration of 0.25 g/50 ml at 25° C.

In one aspect, the process(es) of the invention can be used to manufacture a copolyester composition comprising:
(I) at least one copolyester which comprises:
(a) a dicarboxylic acid component comprising:
(i) 70 to 100 mole % of terephthalic acid residues;
(ii) 0 to 30 mole % of the residues of at least one aromatic dicarboxylic acid having up to 20 carbon atoms; and
(iii) 0 to 10 mole % of the residues of at least one aliphatic dicarboxylic acid having up to 16 carbon atoms; and (b) a diol component comprising:
  (i) 20 to 35 mole % of 2,2,4,4-tetramethyl-1,3-cyclobutanediol residues;
  (ii) 65 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.55 to 0.75 dL/g as determined in 60/40 (wt/wt) phenol/tetrachloroethane at a concentration of 0.25 g/50 ml at 25° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 20 to 35 mole % of 2,2,4,4-tetramethyl-1,3-cyclobutanediol residues;
    (ii) 65 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the copolyester has a Tg from 100 to 125° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 20 to 35 mole % of 2,2,4,4-tetramethyl-1,3-cyclobutanediol residues;
    (ii) 65 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.55 to 0.75 dL/g as determined in 60/40 (wt/wt) phenol/tetrachloroethane at a concentration of 0.25 g/50 ml at 25° C.; and wherein the copolyester has a Tg from 100 to 125° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 20 to 35 mole % of 2,2,4,4-tetramethyl-1,3-cyclobutanediol residues;
    (ii) 65 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.55 to 0.80 dL/g as determined in 60/40 (wt/wt) phenol/tetrachloroethane at a concentration of 0.25 g/50 ml at 25° C.; and wherein the copolyester has a Tg from 95 to 150° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 20 to 25 mole % of 2,2,4,4-tetramethyl-1,3-cyclobutanediol residues;
    (ii) 75 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.69 to 0.75 dL/g as determined in 60/40 (wt/wt) phenol/tetrachloroethane at a concentration of 0.25 g/50 ml at 25° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and (b) a diol component comprising:
   (i) 20 to 25 mole % of 2,2,4,4-tetramethyl-1,3-cyclobutanediol residues;
   (ii) 75 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the copolyester has a Tg from 105 to 112° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 20 to 25 mole % of 2,2,4,4-tetramethyl-1,3-cyclobutanediol residues;
      (ii) 75 to 80 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.69 to 0.75 dL/g as determined in 60/40 (wt/wt) phenol/tetrachloroethane at a concentration of 0.25 g/50 ml at 25° C.; and wherein the copolyester has a Tg from 105 to 112° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 30 to 35 mole % of 2,2,4,4-tetramethyl-1,3-cyclobutanediol residues;
      (ii) 65 to 70 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.61 to 0.68 dL/g as determined in 60/40 (wt/wt) phenol/tetrachloroethane at a concentration of 0.25 g/50 ml at 25° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 30 to 35 mole % of 2,2,4,4-tetramethyl-1,3-cyclobutanediol residues;
      (ii) 65 to 70 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the copolyester has a Tg from 114 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 30 to 35 mole % of 2,2,4,4-tetramethyl-1,3-cyclobutanediol residues;
      (ii) 65 to 70 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.61 to 0.68 dL/g as determined in 60/40 (wt/wt) phenol/tetrachloroethane at a concentration of 0.25 g/50 ml at 25° C.; and wherein the copolyester has a Tg from 114 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and (b) a diol component comprising:
  (i) 20 to 35 mole % of 2,2,4,4-tetramethyl-1,3-cyclobutanediol residues;
  (ii) 65 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.55 to 0.67 dL/g as determined in 60/40 (wt/wt) phenol/tetrachloroethane at a concentration of 0.25 g/50 ml at 25° C.; and wherein the copolyester has a Tg from 105 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of aliphatic dicarboxylic acid residues having up to 16 carbon atoms; and
  (b) a diol component comprising:
    (i) 20 to 35 mole % of 2,2,4,4-tetramethyl-1,3-cyclobutanediol residues;
    (ii) 65 to 80 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the copolyester has a Tg from 108 to 116° C.

In one aspect, the process(es) of the invention can be used to manufacture a copolyester composition comprisi:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 21 to 25 mole % of 2,2,4,4-tetramethyl-1,3-cyclobutanediol residues;
    (ii) 75 to 79 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.6 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 20 to 25 mole % of 2,2,4,4-tetramethyl-1,3-cyclobutanediol residues;
    (ii) 75 to 80 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.65 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and
  (b) a diol component comprising:
    (i) 21 to 25 mole % of 2,2,4,4-tetramethyl-1,3-cyclobutanediol residues;
    (ii) 75 to 79 mole % of cyclohexanedimethanol residues; and
  (II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.65 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
  (a) a dicarboxylic acid component comprising:
    (i) 70 to 100 mole % of terephthalic acid residues;
    (ii) 0 to 30 mole % of the residues of at least one aromatic dicarboxylic acid having up to 20 carbon atoms; and
    (iii) 0 to 10 mole % of the residues of at least one aliphatic dicarboxylic acid having up to 16 carbon atoms; and (b) a diol component comprising:
   (i) 21 to 25 mole % of 2,2,4,4-tetramethyl-1,3-cyclobutanediol residues;
   (ii) 75 to 79 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.7 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 15 to 25 mole % of 2,2,4,4-tetramethyl-1,3-cyclobutanediol residues;
      (ii) 75 to 85 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 20 to 25 mole % of 2,2,4,4-tetramethyl-1,3-cyclobutanediol residues;
      (ii) 75 to 80 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 21 to 25 mole % of 2,2,4,4-tetramethyl-1,3-cyclobutanediol residues;
      (ii) 75 to 79 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.6 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 15 to 25 mole % of 2,2,4,4-tetramethyl-1,3-cyclobutanediol residues;
      (ii) 75 to 85 mole % of cyclohexanedimethanol residues; and
   (II) at least one thermal stabilizer chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and the total mole % of the diol component is 100 mole %; and wherein the inherent viscosity of the copolyester is from 0.69 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and (b) a diol component comprising:
   (i) 20 to 25 mole % of 2,2,4,4-tetramethyl-1,3-cyclobutanediol residues;
   (ii) 75 to 80 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.69 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, the process(es) of the invention can be used to manufacture a copolyester composition comprising:
(I) at least one copolyester which comprises:
   (a) a dicarboxylic acid component comprising:
      (i) 70 to 100 mole % of terephthalic acid residues;
      (ii) 0 to 30 mole % of the residues of at least one aromatic dicarboxylic acid having up to 20 carbon atoms; and
      (iii) 0 to 10 mole % of the residues of at least one aliphatic dicarboxylic acid having up to 16 carbon atoms; and
   (b) a diol component comprising:
      (i) 21 to 25 mole % of 2,2,4,4-tetramethyl-1,3-cyclobutanediol residues;
      (ii) 75 to 79 mole % of cyclohexanedimethanol residues; and
(II) at least one thermal stabilizer chosen from at least one of alkyl phosphate esters, aryl phosphate esters, mixed alkyl aryl phosphate esters, reaction products thereof, and mixtures thereof;
wherein the total mole % of the dicarboxylic acid component is 100 mole %, and the total mole % of the diol component is 100 mole %; and wherein the inherent viscosity of the copolyester is from 0.69 to 0.75 dL/g as determined in 60/40 (wt/wt) phenol/tetrachloroethane at a concentration of 0.25 g/50 ml at 25° C.; and wherein the copolyester has a Tg from 100 to 120° C.

In one aspect, made by the processes of the invention can comprise tin atoms. In another aspect, the copolyesters and/or copolyester compositions made by the processes of the invention can contain at least one polycarbonate.

In one aspect, the copolyesters made by the processes of the invention can contain ethylene glycol residues. In another aspect, the copolyesters made by the processes of the invention contain no ethylene glycol residues. In another aspect, the copolyesters made by the processes of the invention can contain at least one branching agent without regard to the method or sequence in which it is added.

In one aspect, the copolyesters made by the processes of the invention can be made with 1,3-propanediol or, 1,4-butanediol, either singly or in combination. In other aspects, 1,3-propanediol or 1,4-butanediol, either singly or in combination, may be used in the process of making the copolyesters useful in this invention.

In one aspect of the invention, the mole % of cis-2,2,4,4-tetramethyl-1,3-cyclobutanediol useful in certain processes of the invention is greater than 50 mole % or greater than 55 mole % of cis-2,2,4,4-tetramethyl-1,3-cyclobutanediol or greater than 70 mole % of cis-2,2,4,4-tetramethyl-1,3-cyclobutanediol; wherein the total mole percentage of cis-2,2,4,4-tetramethyl-1,3-cyclobutanediol and trans-2,2,4,4-tetramethyl-1,3-cyclobutanediol is equal to a total of 100 mole %.

In one aspect of the invention, the mole % of the isomers of 2,2,4,4-tetramethyl-1,3-cyclobutanediol useful in certain processes of the invention is from 30 to 70 mole % of cis-2,2,4,4-tetramethyl-1,3-cyclobutanediol or from 30 to 70 mole % of trans-2,2,4,4-tetramethyl-1,3-cyclobutanediol, or from 40 to 60 mole % of cis-2,2,4,4-tetramethyl-1,3-cyclobutanediol or from 40 to 60 mole % of trans-2,2,4,4-tetramethyl-1,3-cyclobutanediol, wherein the total mole percentage of cis-2,2,4,4-tetramethyl-1,3-cyclobutanediol and trans-2,2,4,4-tetramethyl-1,3-cyclobutanediol is equal to a total of 100 mole %.

In one aspect, the copolyesters and/or copolyester compositions made by the processes of the invention can comprise phosphorus atoms. In another aspect, the copolyesters made by the processes of the invention can comprise at least one phosphate ester.

In one aspect, the copolyesters made by the processes of the invention can comprise phosphorus atoms and tin atoms. In another aspect, any of the copolyesters made by the processes of the invention may comprise at least one tin compound and at least one titanium compound.

In one aspect, any of the copolyester compositions made by the processes of the invention may comprise at least one aryl phosphate ester. In another aspect, any of the copolyester compositions made by the processes of the invention may comprise at least one unsubstituted aryl phosphate ester. In yet another aspect, any of the copolyester compositions made by the processes of the invention may comprise at least one aryl phosphate ester which is not substituted with benzyl groups. In still another aspect, any of the copolyester compositions made by the processes of the invention may comprise at least one triaryl phosphate ester. In still another aspect, any of the copolyester compositions made by the processes of the invention may comprise at least one triaryl phosphate ester which is not substituted with benzyl groups. In yet another aspect, any of the copolyester compositions made by the processes of the invention may comprise at least one alkyl phosphate ester. In another aspect, any of the processes of the invention may comprise at least one tin compound as described herein.

In one embodiment, the presence of the phosphorus compound(s) in the process(es) of the invention can result in a weight ratio of total tin atoms to total phosphorus atoms in the final copolyester of 2-10:1. In one embodiment, the presence of the phosphorus compound(s) in the process(es) can result in a weight ratio of total tin atoms to total phosphorus atoms in the final copolyester of 5-9:1. In one embodiment, the presence of the phosphorus compound(s) in the process(es) can result in a weight ratio of total tin atoms to total phosphorus atoms in the final copolyester of 6-8:1. In one embodiment, the presence of the phosphorus compound(s) in the process(es) can result in a weight ratio of total tin to total phosphorus in the final copolyester of 7:1. For example, the weight of tin and phosphorus (as elemental tin or phosphorus) present in the final copolyester can be measured in ppm and can result in a weight ratio of total tin to total phosphorus in the final copolyester of any of the aforesaid weight ratios.

In one embodiment, the amount of tin in the final copolyesters made by the processes of the invention can be from 15 to 400 ppm tin based on the weight of the final copolyester. In another embodiment, the amount of tin in the final copolyesters made by the processes of the invention can be from 25 to 400 ppm tin based on the weight of the final copolyester. In yet another embodiment, the amount of tin in the final copolyesters made by the processes of the invention can be from 40 to 200 ppm tin based on the weight of the final copolyester. In yet another embodiment, the amount of tin in the final copolyesters made by the processes of the invention can be from 50 to 125 ppm tin atoms based on the weight of the final copolyester.

In one embodiment, the amount of phosphorus in the final copolyesters made by the processes of the invention can be from 1 to 100 ppm phosphorus based on the weight of the final copolyester. In another embodiment, the amount of phosphorus in the final copolyesters made by the processes of in the invention can be from 4 to 60 ppm phosphorus based on the weight of the final copolyester. In yet another embodiment, the amount of phosphorus atoms in the final copolyesters made by the processes of the invention can be from 6 to 20 ppm phosphorus based on the weight of the final copolyester.

In one embodiment, the amount of phosphorus in the final copolyesters made by the processes of the invention can be from 1 to 100 ppm phosphorus based on the weight of the final copolyester and the amount of tin in the final copolyester can be from 15 to 400 ppm tin based on the weight of the final copolyester. In another embodiment, the amount of phosphorus in the final copolyesters made by the processes of the invention can be from 1 to 100 ppm phosphorus based on the weight of the final copolyester and the amount of tin in the final copolyester can be from 25 to 400 ppm tin based on the weight of the final copolyester. In yet another embodiment, the amount of phosphorus in the final copolyesters made by the processes of the invention can be from 4 to 60 ppm phosphorus based on the weight of the final copolyester and the amount of tin in the final copolyester can be from 40 to 200 ppm tin based on the weight of the final copolyester. In yet another embodiment, the amount of phosphorus in the final copolyesters made by the processes of the invention can be from 6 to 20 ppm phosphorus based on the weight of the final copolyester and the amount of tin in the final copolyester made by the processes of the invention can be from 50 to 125 ppm tin based on the weight of the final copolyester.

The copolyesters produced by the process of the invention can have a glass transition temperature of about 85 to about 200° C. Additional examples of glass transition temperatures include about 100 to about 120° C., about 105 to about 115° C., and about 110 to about 120° C. The glass transition temperature (Tg) of the copolyesters can be determined using a TA DSC 2920 scanning calorimeter from Thermal Analyst Instrument at a scan rate of 20° C./min.

The thermoplastic copolyesters prepared by the process of the invention typically have an inherent viscosity, abbreviated herein as "IV", of at least 0.1 dL/g. Other examples of IV ranges include about 0.4 to 1.2 dL/g and about 0.4 to about 1 dL/g. For embodiments of the invention, the copolyesters produced by the process of the invention may exhibit at least one of the following inherent viscosities as determined in 60/40 (wt/wt) phenol/tetrachloroethane at a concentration of 0.25 g/50 ml at 25° C.: 0.10 to 1.2 dL/g; 0.10 to 1.1 dL/g; 0.10 to 1 dL/g; 0.10 to less than 1 dL/g; 0.10 to 0.98 dL/g; 0.10 to 0.95 dL/g; 0.10 to 0.90 dL/g; 0.10 to 0.85 dL/g; 0.10 to 0.80 dL/g; 0.10 to 0.75 dL/g; 0.10 to less than 0.75 dL/g; 0.10 to 0.72 dL/g; 0.10 to 0.70 dL/g; 0.10 to less than 0.70 dL/g; 0.10 to 0.68 dL/g; 0.10 to less than 0.68 dL/g; 0.10 to 0.65 dL/g; 0.10 to 0.6 dL/g; 0.10 to 0.55 dL/g; 0.10 to 0.5 dL/g; 0.10 to 0.4 dL/g; 0.10 to 0.35 dL/g; 0.20 to 1.2 dL/g; 0.20 to 1.1 dL/g; 0.20 to 1 dL/g; 0.20 to less than 1 dL/g; 0.20 to 0.98 dL/g; 0.20 to 0.95 dL/g; 0.20 to 0.90 dL/g; 0.20 to 0.85 dL/g; 0.20 to 0.80 dL/g; 0.20 to 0.75 dL/g; 0.20 to less than 0.75 dL/g; 0.20 to 0.72 dL/g; 0.20 to 0.70 dL/g; 0.20 to less than 0.70 dL/g; 0.20 to 0.68 dL/g; 0.20 to less than 0.68 dL/g; 0.20 to 0.65 dL/g; 0.20 to 0.6 dL/g; 0.20 to 0.55 dL/g; 0.20 to 0.5 dL/g; 0.20 to 0.4 dL/g; 0.20 to 0.35 dL/g; 0.35 to 1.2 dL/g; 0.35 to 1.1 dL/g; 0.35 to 1 dL/g; 0.35 to less than 1 dL/g; 0.35 to 0.98 dL/g; 0.35 to 0.95 dL/g; 0.35 to 0.90 dL/g; 0.35 to 0.85 dL/g; 0.35 to 0.80 dL/g; 0.35 to 0.75 dL/g; 0.35 to less than 0.75 dL/g; 0.35 to 0.72 dL/g; 0.35 to 0.70 dL/g; 0.35 to less than 0.70 dL/g; 0.35 to 0.68 dL/g; 0.35 to less than 0.68 dL/g; 0.35 to 0.65 dL/g; 0.40 to 1.2 dL/g; 0.40 to 1.1 dL/g; 0.40 to 1 dL/g; 0.40 to less than 1 dL/g; 0.40 to 0.98 dL/g; 0.40 to 0.95 dL/g; 0.40 to 0.90 dL/g; 0.40 to 0.85 dL/g; 0.40 to 0.80 dL/g; 0.40 to 0.75 dL/g; 0.40 to less than 0.75 dL/g; 0.40 to 0.72 dL/g; 0.40 to 0.70 dL/g; 0.40 to less than 0.70 dL/g; 0.40 to 0.68 dL/g; 0.40 to less than 0.68 dL/g; 0.40 to 0.65 dL/g; greater than 0.42 to 1.2 dL/g; greater than 0.42 to 1.1 dL/g; greater than 0.42 to 1 dL/g; greater than 0.42 to less than 1 dL/g; greater than 0.42 to 0.98 dL/g; greater than 0.42 to 0.95 dL/g; greater than 0.42 to 0.90 dL/g; greater than 0.42 to 0.85 dL/g; greater than 0.42 to 0.80 dL/g; greater than 0.42 to 0.75 dL/g; greater than 0.42 to less than 0.75 dL/g; greater than 0.42 to 0.72 dL/g; greater than 0.42 to 0.70 dL/g; greater than 0.42 to less than 0.70 dL/g; greater than 0.42 to 0.68 dL/g; greater than 0.42 to less than 0.68 dL/g; and greater than 0.42 to 0.65 dL/g.

For embodiments of the invention, the copolyesters useful in the invention may exhibit at least one of the following inherent viscosities as determined in 60/40 (wt/wt) phenol/tetrachloroethane at a concentration of 0.25 g/50 ml at 25° C.: 0.45 to 1.2 dL/g; 0.45 to 1.1 dL/g; 0.45 to 1 dL/g; 0.45 to 0.98 dL/g; 0.45 to 0.95 dL/g; 0.45 to 0.90 dL/g; 0.45 to 0.85 dL/g; 0.45 to 0.80 dL/g; 0.45 to 0.75 dL/g; 0.45 to less than 0.75 dL/g; 0.45 to 0.72 dL/g; 0.45 to 0.70 dL/g; 0.45 to less than 0.70 dL/g; 0.45 to 0.68 dL/g; 0.45 to less than 0.68 dL/g; 0.45 to 0.65 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.67 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.60 to 0.64 dL/g; 0.61 to 0.68 dL/g; 0.64 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g.

In one embodiment, the polyesters made by the processes useful in the invention and/or the article of manufacture of the invention can exhibit at least one of the following densities: a density of less than 1.3 g/ml at 23° C.; a density of less than 1.2 g/ml at 23° C.; a density of less than 1.18 g/ml at 23° C.; a density of 0.70 to 1.2 g/ml at 23° C.; a density of 0.70 to 1.3 g/ml at 23° C.; a density of 0.70 to less than 1.2 g/ml at 23° C.;

a density of 0.75 to 1.2 at 23° C.; a density of 0.75 g/ml to less than 1.2 at 23° C.; a density of 0.80 g/ml to 1.2 at 23° C.; a density of 0.80 to less than 1.2 g/ml at 23° C.; a density of 0.90 to 1.2 g/ml at 23° C.; a density of 1.0 to 1.2 g/ml at 23° C.; a density of 1.0 to 1.3 g/ml at 23° C.; a density of 1.1 to 1.2 g/ml at 23° C.; a density of 1.1 to less than 1.2 g/ml at 23° C.; a density of 1.13 to 1.3 g/ml at 23° C. a density of 1.13 to 1.2 g/ml at 23° C.; a density of 0.80 to 1.18 at 23° C.; a density of 0.80 to less than 1.18 g/ml at 23° C.; a density of 1.0 to less than 1.18 g/ml at 23° C.; a density of 1.1 to less than 1.18 g/ml at 23° C.

In one embodiment of the invention, the thermoplastic copolyester has an inherent viscosity of about 0.5 to about 0.8 dL/g, a Tg of about 100 to about 120° C., and comprises (a) diacid residues comprising 100 mole percent of the residues of terephthalic acid; and (b) diol residues comprising about 20 to about 40 mole percent of the residues of 2,2,4,4-tetramethyl-1,3-cyclobutanediol, and about 60 to about 80 mole percent of the residues of 1,4-cyclohexanedimethanol; (c) 1 to 100 ppm phosphorus, based on the total weight of the final copolyester, and (d) 15 to 400 ppm tin, based on the weight of the final copolyester.

In yet another embodiment, the present invention also provides a process for the preparation of a copolyester, comprising: reacting a diester composition, comprising at least one dialkyl terephthalic acid ester, with a diol composition, the diol composition comprising a first diol component comprising 2,2,4,4-tetramethyl-1,3-cyclobutanediol and a second diol component comprising 1,4-cyclohexanedimethanol, the reaction comprising
(i) reacting the first diol component with the diester component to form a polyester oligomer at a conversion of the 2,2,4,4-tetramethyl-1,3-cyclobutanediol of at least 50 mole percent, based on the total moles of the 2,2,4,4-tetramethyl-1,3-cyclobutanediol in the diol composition;
(ii) reacting the second diol component with the polyester oligomer of step (i) form a modified polyester oligomer; and
(iii) heating the modified polyester oligomer to form a thermoplastic, random copolyester having an inherent viscosity of about 0.4 dL/g to about 1 dL/g;
wherein the molar ratio of all diols in the diol composition to all diesters in the diester composition is about 1.1 to about 1.5. The above process is understood to include the various embodiments of the diol and diester components, process conditions, copolyesters, thermal stabilizers, catalysts, glass transition temperatures, IV's, etc., as described hereinabove. The conversion of the TMCD to polyester oligomer in step (i) of the reaction is at least 50 mole percent, based on the total moles of TMCD in the diol composition.

The molar ratio of all diols in the diol composition to all diesters in the diester composition is about 1.1 to about 1.5. Additional examples of total diol:diester molar ratios are about 1.1 to about 1.4, about 1.1 to about 1.3, about 1.1 to about 1.2, 1.15 to about 1.45, about 1.15 to about 1.40, about 1.15 to about 1.35, about 1.15 to about 1.3, about 1.15 to about 1.25, about 1.15 to about 1.2, about 1.2 to about 1.45; about 1.2 to about 1.4, about 1.2 to about 1.35, about 1.2 to about 1.3, and about 1.2 to about 1.25. Some additional, specific examples of total diol:diester molar ratios which may be used in the process of the invention are 1.1, 1.12, 1.13, 1.15, 1.17, 1.20, 1.22, 1.25, 1.27, 1.30, 1.32, 1.35, 1.37, 1.40, 1.43, 1.45, and 1.50. The process can produce a random, thermoplastic copolyester having an IV of about 0.4 to about 1 dL/g. For example, in one embodiment, the thermoplastic copolyester may have an IV of at least 0.4. Examples of other IV ranges for the copolyesters produced by our process are about 0.50 to about 0.80 dL/g and about 0.50 to about 0.75 dL/g. Additional examples of IV values and ranges are described hereinabove.

As described previously, the diester composition comprises a dialkyl ester of terephthalic acid. The dialkyl ester of can comprise the residues of a primary alcohol having from 1 to 8 carbon atoms. Examples of primary alcohols include, but are not limited to methyl, ethyl, propyl, isopropyl, butyl, isobutyl, pentyl, hexyl, and 2-ethylhexyl alcohol. For example, the diester composition may comprise about 100 mole percent dimethyl terephthalate, based on the total moles of diester in the diester composition. The diester composition may additionally comprise one or more dicarboxylic acid diesters selected from naphthalenedicarboxylic acid, 1,4-cyclohexanedicarboxylic acid, isophthalic acid, and combinations thereof. In addition to the dicarboxylic acid diesters listed above, the diester component may further comprise about one or more modifying dicarboxylic acid diesters. Examples of modifying dicarboxylic acid diesters include, but are not limited to, diesters of fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids. For example, the diester composition may further comprise at least one dialkyl ester of isophthalic acid in addition to the diester of terephthalic acid.

The diol composition comprises a first diol component comprising 2,2,4,4-tetramethyl-1,3-cyclobutanediol and a second diol component comprising 1,4-cyclohexanedimethanol. The CHDM and TMCD may be used as a pure cis or trans isomer or as a mixture of cis and trans isomers. In addition to CHDM and TMCD, the process of the invention may further comprise reacting one or more diols selected from neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, polyalkylene glycol, and combinations thereof with the polyester oligomer or modified polyester oligomer.

The first diol component can comprise about 70 to about 100 mole percent of the 2,2,4,4-tetramethyl-1,3-cyclobutanediol, based on the total moles of 2,2,4,4-tetramethyl-1,3-cyclobutanediol in the diol composition, and 0 to about 80 mole percent of the 1,4-cyclohexanedimethanol, based on the total moles of 1,4-cyclohexanedimethanol the diol composition. Other examples of mole percentages of TMCD within the first diol component are 75, 80, 85, 90, and 95 mole percent, based on the total moles of TMCD in the diol composition. Further examples of mole percentages of CHDM within the first diol component are 5, 10, 15, 20, 25, 30, 35, 40, 45, 50, 55, 60, 65, 70, and 75 mole percent, based on the total moles of CHDM in the diol composition. In one embodiment, for example, the first diol component can comprise about 100 mole percent 2,2,4,4-tetramethyl-1,3-cyclobutanediol, based on the total moles of TMCD in the diol composition, and about 60 to about 80 mole percent of 1,4-cyclohexanedimethanol, based on the total CHDM in the diol composition.

The second diol component can comprise about 20 to about 100 mole percent of the 1,4-cyclohexanedimethanol, based on the total moles of 1,4-cyclohexanedimethanol in diol composition, and 0 to about 30 mole percent of the 2,2,4,4-tetramethyl-1,3-cyclobutanediol, based on the total moles of 2,2,4,4-tetramethyl-1,3-cyclobutanediol in the diol composition. Additional examples of mole percentages of CHDM in the second diol component, based on the total moles of CHDM in the diol composition, are 25, 30, 35, 40, 45, 50, 55, 60, 65, 70, 75, 80, 85, 90, and 95 mole percent. Additional examples of mole percentages of TMCD in the second diol component, based on the total moles of TMCD in the diol composition, are 5, 10, 15, 20, and 25 mole percent. In an additional example, the second diol component can comprise about 20 to about 40 mole percent of the 1,4-cyclohexanedimethanol, based on the total moles of CHDM in the diol composition.

The reaction of the diester composition with the first and second diol composition can be carried out incrementally as described previously. For example, the process may further comprise adding the first diol component incrementally to the diester composition in step (i), adding the second diol component incrementally to the polyester oligomer in step (ii), or a combination thereof. For example, in one embodiment of the invention, the addition of the first and second diol components in step (i) and (ii) each are carried out in 2 or more stages. As described above, the diester composition also may be added to the reaction zone or reacted with one or more of the diol components incrementally. In another embodiment, the addition of the first and second diol components in step (i) and (ii) each are carried out continuously. The reaction temperature, pressures, and residences times are as described previously.

Also as described above, the reactions of both steps may be catalyzed by appropriate catalysts such as, for example, various compounds of titanium, tin, antimony, germanium, and mixtures thereof. In one aspect, any of the processes of the invention may comprise at least one tin compound and, optionally, at least one catalyst chosen from titanium, gallium, zinc, antimony, cobalt, manganese, magnesium, germanium, lithium, aluminum compounds and an aluminum compound with lithium hydroxide or sodium hydroxide. Typically, the catalyst can be present in the range of 1 to 500 ppm. Examples of catalysts useful in the present invention include, but are not limited to, one of more of the following: butyltin tris-2-ethylhexanoate, dibutyltin diacetate, dibutyltin oxide, and dimethyl tin oxide. a phosphorus compound inhibitor may optionally be used. For example, the catalyst may comprise at least one tin compound. In another embodiment, any of the processes of making the copolyesters useful in the invention may be prepared using a catalyst comprising at least one tin compound and at least one titanium compound.

The process of the invention, in certain cases, may include a thermal stabilizer comprising a phosphorus compound. For example, the phosphorus compounds useful in the invention can comprise phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. For example, the thermal stabilizer can comprise at least one compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed alkyl aryl phosphites, reaction products thereof, and mixtures thereof. The phosphate esters include esters in which the phosphoric acid is fully esterified or only partially esterified. In one embodiment, the thermal stabilizer may comprise triaryl phosphates. In another embodiment, the thermal stabilizer may comprise triaryl phosphates and/or mixed alkyl aryl phosphates. In yet another aspect, the thermal stabilizer may comprise use of triphenyl phosphate and/or Merpol A. In yet another aspect, the thermal stabilizer of the invention may comprise triphenyl phosphate.

The copolyesters produced by our process typically can comprise about 60 to 100 mole percent, based on the total moles of diacid residues, of the residues of terephthalic acid, isophthalic acid, or combinations thereof; and about 10 to about 90 mole percent, based on the total moles of diol residues, of the residues 1,4-cyclohexanedimethanol and about 10 to about 90 mole percent of the residues of 2,2,4,4-tetramethyl-1,3-cyclobutanediol. In addition to CHDM and TMCD, the copolyester may comprise from about 0 to about 80 mole percent of the residues of one or more diols selected from neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, polyalkylene glycol, and combinations thereof.

For example, the thermoplastic copolyester can comprise about 80 to 100 mole, based on the total diacid residues, of the residues of terephthalic acid and about 85 to greater than 50 mole percent, based on the total diol residues, of the residues of 1,4-cyclohexanedimethanol and about 15 to less than 50 mole percent of the residues of 2,2,4,4-tetramethyl-1,3-cyclobutanediol. In another example, the copolyester may comprise (a) diacid residues comprising about 70 to about 100 mole percent of the residues of terephthalic acid, 0 to 30 mole percent of the residues of at least one aromatic dicarboxylic acid having up to 20 carbon atoms, and 0 to about 10 mole percent of the residues of at least one aliphatic dicarboxylic acid having up to 16 carbon atoms; and (b) diol residues comprising about 20 to about 40 mole percent of the residues of 2,2,4,4-tetramethyl-1,3-cyclobutanediol, and about 60 to about 80 mole percent of the residues of 1,4-cyclohexanedimethanol. In another example, the copolyester may comprise about 95 mole percent of the residues of terephthalic acid and about 5 mole percent of the residues of isophthalic acid. In yet another example, the copolyester may comprise about 100 mole percent of the residues of terephthalic acid. Some additional examples of copolyester compositions which may be produced for the process of the invention are those comprising diacid residues comprising about 70 to about 100 mole percent of the residues of terephthalic acid, 0 to about 30 mole percent of the residues of at least one aromatic dicarboxylic acid having up to 20 carbon atoms, and 0 to about 10 mole percent of the residues of at least one aliphatic dicarboxylic acid having up to 16 carbon atoms; and diol residues comprising (a) about 20 to about 35 mole percent of the residues of 2,2,4,4-tetramethyl-1,3-cyclobutanediol, and about 65 to about 80 mole percent of the residues of 1,4-cyclohexanedimethanol; (b) about 30 to about 40 mole percent of the residues of 2,2,4,4-tetramethyl-1,3-cyclobutanediol, and about 60 to about 70 mole percent of the residues of 1,4-cyclohexanedimethanol; (c) about 20 to about 25 mole percent of the residues of 2,2,4,4-tetramethyl-1,3-cyclobutanediol, and about 75 to about 80 mole percent of the residues of 1,4-cyclohexanedimethanol: (d) about 30 to about 35 mole percent of the residues of 2,2,4,4-tetramethyl-1,3-cyclobutanediol, and 65 to 70 mole percent of the residues of 1,4-cyclohexanedimethanol.

In one embodiment of the invention, the thermoplastic copolyester has an inherent viscosity of about 0.5 to about 0.8 dL/g, a Tg of about 100 to about 120° C., and comprises (a) diacid residues comprising 100 mole percent of the residues of terephthalic acid; and (b) diol residues comprising about 20 to about 40 mole percent of the residues of 2,2,4,4-tetramethyl-1,3-cyclobutanediol, and about 60 to about 80 mole percent of the residues of 1,4-cyclohexanedimethanol; (c) 1 to 100 ppm phosphorus, based on the total weight of the final copolyester, and (d) 15 to 400 ppm tin, based on the weight of the final copolyester.

In yet another embodiment, the instant invention provides a process for the preparation of a copolyester, comprising: A process for the preparation of a copolyester, comprising: reacting a diester composition comprising dimethyl terephthalate with a diol composition comprising a first diol component comprising 2,2,4,4-tetramethyl-1,3-cyclobutanediol and a second diol component comprising 1,4-cyclohexanedimethanol, the reaction comprising (i) reacting the first diol component comprising about 100 mole percent of the 2,2,4,4-tetramethyl-1,3-cyclobutanediol, based on the total moles of 2,2,4,4-tetramethyl-1,3-cyclobutanediol in the diol composition, and 30 to about 80 mole percent of the 1,4-cyclohexanedimethanol, based on the total moles of 1,4-cyclohexanedimethanol in the diol composition, with the diester component to form a polyester oligomer at a conversion of the 2,2,4,4-tetramethyl-1,3-cyclobutanediol of at least 50 mole percent, based on the total moles of the 2,2,4,4-tetramethyl-1,3-cyclobutanediol in the diol composition;

(ii) reacting the second diol component comprising about 20 to about 70 mole percent the 1,4-cyclohexanedimethanol based on the total moles of 1,4-cyclohexanedimethanol in the diol composition, with the polyester oligomer of step (i) form a modified polyester oligomer; and (iii) heating the modified polyester oligomer to form a thermoplastic, random copolyester having an inherent viscosity of about 0.4 dL/g to about 1.0;

wherein the molar ratio of all diols in the diol composition to all diesters in the diester composition is about 1.1 to about 1.5. The various embodiments of the diol and diester components, process conditions, catalysts, thermal stabilizers, IV's, glass transition temperatures, mole ratios, copolyesters, and the like, are as described hereinabove.

EXAMPLES

The invention is further illustrated by the following examples. Inherent viscosities (IV) were measured in 60/40 (wt/wt) phenol/tetrachloroethane at a concentration of 0.25 g/50 ml at 25° C. according to standard methods that are described in ASTM Method D4603. The catalyst and phosphorus concentrations in the final copolyesters of the present invention were determined by x-ray fluorescence using standard methods known in the art and are reported on an elemental basis in part-per-million (ppm), based on the total weight of the final polymer. Polymer compositions were determined by $^1$H NMR (JEOL Eclipse Plus 600 MHz spectrometer) in chloroform-trifluoroacetic acid (70/30 vol/vol) solvent using peak integration techniques well known to persons skilled in the art. The TMCD conversion to oligomers also was determined by $^1$H NMR using a 60/40 (wt/wt) phenol/tetrachloroethane solvent in addition to chloroform-d for lock. Peak assignments for TMCD glycol resonances (for the protons adjacent to the ester carbonyl groups) were made by comparison of model mono and dibenzoate esters of TMCD. These model compounds approximate closely the actual resonance positions of the polymer and oligomer samples. The conversion was determined by peak integration of the unreacted DMT in the sample or, alternatively, by peak integration of reacted TMCD diol. In all examples, unless otherwise indicated, the reactions were carried through to stage 19 in accordance to the profile shown in Table 1 until the allotted time was reached or until the polymer melt reached a high viscosity preventing further agitation. The diol to diester mole ratios shown in the following Tables are based on the total moles of diol and diester used in the reaction.

Examples 1-10 and Comparative Examples 1-9

A copolyester of dimethyl terephthalate was produced by charging 97.90 grams of dimethyl terephthalate (DMT), 28.90 grams of the 1,1,2,2-tetramethyl-1,3-cyclobutanediol (TMCD), 18.25 grams of 1,4-cyclohexanedimethanol (CHDM), approximately 200 parts per million (ppm) tin (added to the reaction mixture as butyltin tris(2-ethylhexoate)) and approximately 30 ppm of phosphorus stabilizer (added to the reaction mixture as triphenyl phosphate), based on the final polymer weight, to a 0.5 liter reaction vessel at room temperature. The reactor vessel was equipped with a mechanical agitator, a side arm for condensate removal, a nitrogen inlet port, and a heat source (generally an oil or metal bath). The reaction vessel was then immersed in the heat source and brought rapidly up to the starting temperature indicated in Table 1. Ester exchange was carried out through Stage 5 in Table 1 below. A second charge of 40.10 grams of CHDM was added in Stage 6. Total diol-to-diester feed mole ratio in this case was 1.20:1. The remaining ester exchange and polymerization were carried out in Stage 6 through 19 in the reaction profile shown in Table 1. For Example 1, the resulting polymer had an IV of 0.656 dl/g, a measured Sn level of 230 ppm and a measured phosphorus level of 30 ppm and exhibited good clarity (transparency).

TABLE 1

| Stage | Time (min) | Start Temp. (° C.) | End Temp (° C.) | Start Press. (kPa) | End Press. (KPa) | Stir Speed Start (RPM) | Stir Speed End (RPM) |
|---|---|---|---|---|---|---|---|
| 1 | 10 | 25 | 180 | 97 | 97 | 0 | 150 |
| 2 | 0.1 | 180 | 190 | 97 | 97 | 150 | 150 |
| 3 | 27 | 190 | 190 | 97 | 97 | 150 | 150 |
| 4 | 0.1 | 190 | 200 | 97 | 97 | 150 | 150 |
| 5 | 27 | 200 | 200 | 97 | 97 | 150 | 150 |
| 6 | 0.1 | 200 | 213 | 97 | 97 | 150 | 150 |
| 7 | 27 | 213 | 213 | 97 | 97 | 150 | 150 |
| 8 | 0.1 | 213 | 226 | 97 | 97 | 150 | 150 |
| 9 | 27 | 226 | 226 | 97 | 97 | 150 | 150 |
| 10 | 0.1 | 226 | 238 | 97 | 97 | 150 | 150 |
| 11 | 27 | 238 | 238 | 97 | 97 | 150 | 150 |
| 12 | 1 | 238 | 245 | 97 | 375 | 150 | 150 |
| 13 | 55 | 245 | 245 | 50 | 50 | 150 | 150 |
| 14 | 5 | 245 | 253 | 50 | 27 | 150 | 100 |
| 15 | 40 | 253 | 253 | 27 | 27 | 100 | 100 |
| 16 | 5 | 253 | 265 | 27 | 0.8 | 100 | 50 |

TABLE 1-continued

| Stage | Time (min) | Start Temp. (° C.) | End Temp (° C.) | Start Press. (kPa) | End Press. (KPa) | Stir Speed Start (RPM) | Stir Speed End (RPM) |
|---|---|---|---|---|---|---|---|
| 17 | 115 | 265 | 265 | 0.8 | 0.8 | 50 | 50 |
| 18 | 5 | 265 | 275 | 0.8 | 0.1 | 50 | 25 |
| 19 | 100 | 275 | 275 | 0.1 | 0.1 | 25 | 25 |

Examples 2-10 and Comparative Examples 1-9 were carried out in a similar manner using the profile in Table 1 for Example 1 but the amount of CHDM added to Stage 6 and the total amount of TMCD added initially was varied. The total addition of CHDM remained constant at approximately 57.7 grams. The addition of TMCD was varied such that the total diol-to-ester mole ratio varied from approximately 1.00 to 1.40. A summary of results is shown in Table 2. Comparative examples 1-9 failed to build sufficient IV and resulted in a opaque, partially solidified melt by Stage 9. These experiments were terminated early and the resulting products were not suitable for IV, Sn, or P analysis. Comparative example 5 also formed a partially solidified melt prior to the end of Stage 9 but produced a final polymer having sufficient IV. The final polymer was opaque because of early oligomer crystallization. Examples 3, 7, 9, and 10 exhibited a cloudy melt prior to Stage 13 because of the onset of crystallization and produced a hazy polymer having an acceptable IV (haziness can be undesirable for applications requiring transparent polymers). Examples 2, 4, 5, 6, and 8, like Example 1, resulted in polymer with an IV greater than 0.50 dl/g which exhibited good clarity. Example 13 was a repeat of Example 11 but used a different dimethyltin oxide as the catalyst instead of butyltin tris(2-ethylhexoate).

TABLE 2

| Example | DMT Added (g) | TMCD Added (g) | CHDM Added Upfront (g) | CHDM Added in Stage 6 (g) | IV (dL/g) | Sn level (ppm) | P level (ppm) | Diol to diester mole ratio |
|---|---|---|---|---|---|---|---|---|
| C1 | 97.20 | 14.44 | 57.62 | 0.00 | n/a | n/a | n/a | 1.00 |
| C2 | 97.20 | 14.50 | 18.55 | 40.50 | n/a | n/a | n/a | 1.02 |
| C3 | 97.20 | 14.70 | 23.07 | 34.65 | n/a | n/a | n/a | 1.00 |
| C4 | 97.30 | 14.82 | 28.88 | 28.90 | n/a | n/a | n/a | 1.00 |
| C5 | 97.10 | 28.85 | 57.50 | 0.00 | 0.547 | 218 | 33 | 1.20 |
| 2 | 97.12 | 28.85 | 23.20 | 34.60 | 0.575 | 205 | 26 | 1.20 |
| 3 | 97.90 | 28.90 | 28.85 | 29.10 | 0.672 | 195 | 25 | 1.19 |
| 4 | 97.30 | 43.28 | 57.80 | 0.00 | 0.667 | 193 | 25 | 1.40 |
| 5 | 97.10 | 44.20 | 17.31 | 40.40 | 0.571 | 212 | 45 | 1.41 |
| 6 | 97.20 | 43.30 | 22.90 | 34.60 | 0.621 | 215 | 39 | 1.40 |
| 7 | 97.10 | 43.50 | 28.80 | 28.90 | 0.416 | 201 | 28 | 1.40 |
| 8 | 97.10 | 43.30 | 23.02 | 34.60 | 0.683 | 264 | 32 | 1.40 |
| C6 | 97.20 | 21.80 | 18.15 | 40.50 | n/a | n/a | n/a | 1.11 |
| 9 | 97.11 | 21.73 | 23.16 | 34.80 | 0.660 | 222 | 30 | 1.10 |
| C7 | 97.16 | 21.77 | 28.74 | 28.80 | n/a | n/a | n/a | 1.10 |
| C8 | 97.20 | 25.61 | 17.62 | 41.00 | n/a | n/a | n/a | 1.17 |
| 10 | 97.11 | 25.74 | 22.91 | 34.80 | 0.714 | 222 | 27 | 1.16 |
| C9 | 98.70 | 25.25 | 28.69 | 28.80 | n/a | n/a | n/a | 1.13 |

Examples 11-20 and Comparative Examples 10-14

A copolyester of dimethyl terephthalate was produced in a similar manner as described above except that the residence time in Stages 3 and 5 of the reaction sequence in Table 1 was increased from 27 minutes to 55 minutes. Total diol-to-diester feed mole ratio was varied from 1.00 to 1.40. A summary of results is shown in Table 3. Comparative examples 10 through 14 resulted in a opaque, partially solidified melt by Stage 9 and were terminated early. The resulting material was not suitable for IV, Sn, or P analysis. Examples 11 through 20 resulted in a polymer with an IV greater than 0.50 dl/g that exhibited good clarity.

TABLE 3

| Example | DMT Added (g) | TMCD Added (g) | CHDM Added Upfront (g) | CHDM Added in Stage 6 (g) | IV (dL/g) | Sn level (ppm) | P level (ppm) | Diol to diester mole ratio |
|---|---|---|---|---|---|---|---|---|
| C10 | 97.10 | 14.55 | 17.23 | 40.60 | n/a | n/a | n/a | 1.00 |
| C11 | 97.10 | 14.17 | 23.48 | 34.30 | n/a | n/a | n/a | 1.00 |
| C12 | 97.10 | 14.95 | 29.00 | 28.02 | n/a | n/a | n/a | 1.00 |

TABLE 3-continued

| Example | DMT Added (g) | TMCD Added (g) | CHDM Added Upfront (g) | CHDM Added in Stage 6 (g) | IV (dL/g) | Sn level (ppm) | P level (ppm) | Diol to diester mole ratio |
|---|---|---|---|---|---|---|---|---|
| 11 | 97.10 | 28.87 | 17.24 | 40.30 | 0.540 | 215 | 28 | 1.20 |
| 12 | 97.12 | 28.85 | 23.19 | 34.50 | 0.732 | 218 | 27 | 1.20 |
| 13 | 97.20 | 28.88 | 28.82 | 28.80 | 0.635 | 212 | 31 | 1.20 |
| 14 | 97.20 | 43.39 | 17.41 | 40.20 | 0.566 | 209 | 30 | 1.40 |
| 15 | 97.08 | 43.27 | 23.33 | 34.50 | 0.518 | 195 | 29 | 1.40 |
| 16 | 97.20 | 43.50 | 28.52 | 28.62 | 0.575 | 202 | 27 | 1.39 |
| C13 | 97.11 | 21.65 | 17.15 | 40.49 | n/a | n/a | n/a | 1.10 |
| 17 | 97.10 | 21.64 | 23.85 | 34.20 | 0.651 | 210 | 32 | 1.11 |
| 18 | 97.10 | 21.65 | 27.67 | 28.80 | 0.652 | 202 | 30 | 1.08 |
| 19 | 97.30 | 25.82 | 17.31 | 41.00 | 0.622 | 212 | 34 | 1.16 |
| C14 | 97.10 | 25.29 | 23.17 | 34.30 | n/a | n/a | n/a | 1.15 |
| 20 | 97.10 | 25.26 | 28.76 | 28.96 | 0.691 | 217 | 32 | 1.15 |

Examples 21-38 and Comparative Examples 15-20

A copolyester of dimethyl terephthalate was produced in a similar manner as Examples 11-20 and Comparative Examples 10-14 except that the reaction temperature in Stage 3 and 5 was increased to 210 degrees Celsius. Total diol-to-diester feed mole ratio was varied from 1.00 to 1.20. A summary of results is shown in Table 4. Comparative examples 15-20 resulted in a opaque, partially solidified melt by the end of Stage 9 and were terminated early. Comparative examples 18, 19, and 20 were conducted with all monomers added upfront (no staged glycol addition) and partially solidified by the end of Stage 3. For these examples, the resulting material was not suitable for IV, Sn, or P analysis. Examples 21 and 22 exhibited a cloudy melt prior to the end of Stage 9 due to the onset of crystallization and exhibited some haziness in the final polymer. Examples 23-29 resulted in a polymer with an IV greater than 0.50 dl/g and exhibited good clarity (transparency).

Examples 30, 32, 33, 34, and 35 were repeat trials of Example 23. Examples 30 and 32 resulted in a polymer with IV greater than 0.50 dl/g but exhibited a cloudy melt in Stage 9. Examples 33-35 also exhibited a cloudy melt in stage and were terminated early in Stage 17 due to loss of vacuum control, and therefore, no analytical data was obtained. Example 31 was a repeat of Example 24. Example 31 resulted in a polymer with IV greater than 0.50 dl/g but exhibited a cloudy melt in Stage 9.

TABLE 4

| Example | DMT Added (g) | TMCD Added (g) | CHDM Added Upfront (g) | CHDM Added in Stage 6 (g) | IV (dL/g) | Sn level (ppm) | P level (ppm) | Diol to diester mole ratio |
|---|---|---|---|---|---|---|---|---|
| C15 | 97.12 | 16.41 | 17.50 | 40.50 | n/a | n/a | n/a | 1.03 |
| C16 | 97.18 | 14.88 | 22.74 | 34.48 | n/a | n/a | n/a | 1.00 |
| C17 | 97.60 | 14.60 | 28.76 | 28.74 | n/a | n/a | n/a | 0.99 |
| C18 | 97.20 | 21.65 | 57.41 | 0.00 | n/a | n/a | n/a | 1.10 |
| 21 | 97.10 | 21.65 | 17.50 | 40.30 | 0.642 | 215 | 25 | 1.10 |
| 22 | 97.12 | 21.71 | 22.56 | 34.45 | 0.617 | 198 | 29 | 1.09 |
| 23 | 97.16 | 21.75 | 28.72 | 28.76 | 0.756 | 208 | 28 | 1.10 |
| C19 | 97.50 | 25.60 | 57.57 | 0.00 | n/a | n/a | n/a | 1.15 |
| 24 | 97.16 | 25.24 | 17.22 | 40.40 | 0.659 | 206 | 31 | 1.15 |
| 25 | 97.13 | 25.26 | 23.39 | 34.59 | 0.714 | 217 | 31 | 1.15 |
| 26 | 97.17 | 25.28 | 28.68 | 28.67 | 0.721 | 222 | 28 | 1.14 |
| C20 | 97.66 | 28.85 | 57.42 | 0.00 | n/a | n/a | n/a | 1.19 |
| 27 | 97.10 | 28.90 | 17.31 | 40.23 | 0.655 | 213 | 37 | 1.20 |
| 28 | 98.00 | 29.80 | 23.22 | 34.55 | 0.509 | 196 | 31 | 1.20 |
| 29 | 97.10 | 28.89 | 28.67 | 28.84 | 0.583 | 215 | 28 | 1.20 |
| 30 | 97.50 | 21.64 | 28.78 | 28.42 | 0.791 | 204 | 26 | 1.09 |
| 31 | 97.10 | 25.24 | 17.11 | 40.24 | 0.683 | 200 | 30 | 1.15 |
| 32 | 97.10 | 21.62 | 28.62 | 28.76 | 0.744 | 212 | 28 | 1.10 |
| 33 | 97.18 | 21.74 | 28.85 | 28.80 | n/a | n/a | n/a | 1.10 |
| 34 | 97.29 | 21.95 | 28.58 | 28.83 | n/a | n/a | n/a | 1.10 |
| 35 | 97.16 | 21.76 | 28.74 | 29.32 | n/a | n/a | n/a | 1.11 |

Examples 36, 37, and 38 were repeat trials of Examples 29, 23, and 26, respectively, carried out through Stage 11 in order to obtain oligomer samples for conversion analysis. Samples were obtained at the end of Stage 5 and the end of Stage 11 and analyzed using $^1$H NMR. The results are summarized in Table 5 below. Total diol-to-diester ratio was less 1.0:1 prior to the final addition of CHDM in Stage 6 and greater than 1.0:1 after the addition of CHDM in Stage 6. The conversion of DMT (ester exchange with TMCD and CHDM), as measured by $^1$H NMR, was in the range of approximately 52% to 60% at the end of Stage 5 prior to the final addition of CHDM and in the range of approximately 89% to 91% at the end of Stage 11 after the final addition of CHDM. Similarly, the conversion of TMCD after stage 5 for Examples 36, 37, and 38 relative to the total amount of TMCD used in the process is 63%, 63%, and 71%, respectively. After stage 11, the TMCD conversions are 71%, 71%, and 73%, respectively.

TABLE 5

| Example | DMT Added (g) | TMCD Added (g) | CHDM Added Upfront (g) | CHDM Added in Stage 6 (g) | DMT (TMCD) conversion after Stage 5 (mol %) | DMT (TMCD) conversion after Stage 11 (mol %) | Diol to diester mole ratio before Stage 6 | Diol to diester mole ratio after Stage 6 |
|---|---|---|---|---|---|---|---|---|
| 36 | 97.10 | 28.85 | 28.86 | 28.76 | 57 (63) | 91 (71) | 0.80 | 1.20 |
| 37 | 98.40 | 21.65 | 29.14 | 28.80 | 52 (63) | 89 (71) | 0.69 | 1.09 |
| 38 | 97.15 | 25.29 | 28.80 | 28.85 | 60 (71) | 91 (73) | 0.75 | 1.15 |

Examples 39-43 and Comparative Examples 2'-23

These were carried out using the same profile in Example Set 1, Table 1. These Examples represent the initial lab trials of the current invention where experimental protocols were being developed and are described below to provide the complete set of experimental data. The results from these trials are summarized in Table 6 below. Phosphorus stabilizer (30 ppm P added as triphenyl phosphate) was used in Comparative Examples 21 and 22, and Example 43. No phosphorus was added in Comparative Example 23, and in Examples 39-42. Comparative Examples 21, 22, and 23, and Examples 39 and 40 did not build sufficient IV. Comparative Example 21 and Examples 39 and 40 exhibited vacuum control problems. Examples 39 and 40 were terminated early as a result. In Comparative Examples 21-23 and Examples 39-42, there was an error in the tin catalyst addition; the target addition used was 0.015 grams versus the desired 0.15 grams. This was confirmed by Example 41 where the measured tin level was 25 ppm versus a target of 200 ppm. Example 41 exhibited an IV greater than 0.50 dl/g, but without the use of a phosphorus stabilizer. Example 42 used the desired addition of tin catalyst (0.15 grams) but exhibited a cloudy melt in Stage 13 which cleared by Stage 17. Example 42 also exhibited vacuum control problems through out Stage 17 and did not exhibit an IV greater than 0.50 dl/g. Example 43 also exhibited a cloudy melt at Stage 13 which cleared by Stage 17.

We claim:

1. A process for the preparation of a copolyester, comprising:
    reacting a diester composition comprising dimethyl terephthalate with a first diol component comprising 2,2,4,4-tetramethyl-1,3-cyclobutanediol and a second diol component comprising 1,4-cyclohexanedimethanol, said reaction comprising
    (i) reacting said first diol component comprising about 100 mole percent of said 2,2,4,4-tetramethyl-1,3-cyclobutanediol, based on the total moles of 2,2,4,4-tetramethyl-1,3-cyclobutanediol in said first and second diol components, and about 30 to about 80 mole percent of said 1,4-cyclohexanedimethanol, based on the total moles of 1,4-cyclohexanedimethanol in said first and second diol components, with said diester composition to form a polyester oligomer at a conversion of said 2,2,4,4-tetramethyl-1,3-cyclobutanediol of at least 50 mole percent, based on the total moles of said 2,2,4,4-tetramethyl-1,3-cyclobutanediol in said first and second diol components;
    (ii) reacting said second diol component comprising about 20 to about 70 mole percent of said 1,4-cyclohexanedimethanol based on the total moles of 1,4-cyclohexanedimethanol in said first and second diol components, with said polyester oligomer of step (i) to form a modified polyester oligomer; and
    (iii) heating said modified polyester oligomer to form a thermoplastic, random copolyester having an inherent viscosity of about 0.4 dL/g to about 1.0 dL/g;
    wherein the molar ratio of all diols in said first and second diol components to all diesters in said diester composition is about 1.1 to about 1.5.

2. The process according to claim 1 wherein said diol:diester molar ratio is about 1.1 to about 1.40.

3. The process according to claim 2 wherein said diol:diester molar ratio is about 1.1 to about 1.20.

4. The process according to claim 1 wherein said thermoplastic copolyester comprises about 100 mole percent, based

TABLE 6

| Example | DMT Added (g) | TMCD Added (g) | CHDM Added Upfront (g) | CHDM Added in Stage 6 (g) | IV (dL/g) | Sn level (ppm) | P level (ppm) | Diol to diester mole ratio |
|---|---|---|---|---|---|---|---|---|
| C21 | 97.09 | 28.87 | 28.80 | 28.90 | n/a | n/a | n/a | 1.03 |
| C22 | 97.10 | 28.81 | 17.25 | 40.30 | n/a | n/a | n/a | 1.00 |
| C23 | 97.09 | 28.84 | 28.81 | 28.90 | n/a | n/a | n/a | 0.99 |
| 39 | 97.30 | 28.90 | 18.58 | 40.40 | n/a | n/a | n/a | 1.10 |
| 40 | 97.10 | 28.90 | 28.72 | 28.90 | n/a | n/a | n/a | 1.10 |
| 41 | 97.10 | 28.90 | 17.30 | 40.38 | 0.651 | 25 | 0 | 1.09 |
| 42 | 97.10 | 14.47 | 17.20 | 40.40 | n/a | n/a | n/a | 1.10 |
| 43 | 97.50 | 28.90 | 24.80 | 34.80 | 0.486 | 229 | 30 | 1.15 | on the total diacid residues, of the residues of terephthalic acid and about 85 to greater than about 50 mole percent, based on the total diol residues, of the residues of 1,4-cyclohexanedimethanol and about 15 to less than about 50 mole percent of the residues of 2,2,4,4-tetramethyl-1,3-cyclobutanediol.

5. The process according to claim 4 wherein said thermoplastic copolyester comprises diol residues comprising about 20 to about 40 mole percent of the residues of 2,2,4,4-tetramethyl-1,3-cyclobutanediol, and about 60 to about 80 mole percent of the residues of 1,4-cyclohexanedimethanol.

6. The process according to claim 1 wherein said inherent viscosity of said thermoplastic copolyester is about 0.5 to about 0.80 dL/g.

7. The process according to claim 1 wherein said inherent viscosity of said thermoplastic copolyester is about 0.55 to about 0.75 dL/g.

8. The process according to claim 1 wherein said thermoplastic copolyester has a glass transition temperature of about 85 to about 200° C.

9. The process according to claim 8 wherein said thermoplastic copolyester has a glass transition temperature of about 100 to about 120° C.

10. The process according to claim 9 wherein said thermoplastic copolyester has a glass transition temperature of about 110 to about 120° C.

11. The process according to claim 1 further comprising adding said first diol component incrementally to said diester composition in step (i), adding said second diol component incrementally to said polyester oligomer in step (ii), or a combination thereof.

12. The process according to claim 11 wherein said addition of said first and second diol components in step (i) and (ii) each are carried out continuously.

13. The process according to claim 1 which is carried out in at least 2 reactors.

14. The process according to claim 1 which is carried out in the presence of a thermal stabilizer comprising triphenyl phosphate and a catalyst comprising at least one tin compound.

15. The process according to claim 1 wherein said thermoplastic copolyester has an inherent viscosity of about 0.5 to about 0.8 dL/g, a Tg of about 100 to about 120° C., and comprises (a) diacid residues comprising 100 mole percent of the residues of terephthalic acid; and (b) diol residues comprising about 20 to about 30 mole percent of the residues of 2,2,4,4-tetramethyl-1,3-cyclobutanediol, and about 70 to about 80 mole percent of the residues of 1,4-cyclohexanedimethanol; (c) about 1 to about 100 ppm phosphorus, based on the total weight of said thermoplastic copolyester, and (d) about 15 to about 400 ppm tin, based on the weight of said thermoplastic copolyester.

* * * * *